3,057,892
CERTAIN POLYOXYALKYLENE GLYCOL ESTERS
Melvin De Groote, St. Louis, Mo., assignor to Petrolite Corporation, Wilmington, Del., a corporation of Delaware
No Drawing. Original application Apr. 17, 1958, Ser. No. 729,054. Divided and this application June 30, 1959, Ser. No. 823,809
1 Claim. (Cl. 260—407)

This application is a division of my co-pending application Serial No. 729,054, filed April 17, 1958, and a continuation-in-part of my co-pending application Serial No. 677,907, filed August 13, 1957. This latter application is in turn a continuation-in-part of my co-pending applications Serial No. 425,944, filed April 27, 1954 (now abandoned), Serial No. 475,727, filed December 16, 1954, and Serial No. 475,728, filed December 16, 1954.

The present invention relates to the monomeric and polymeric solvent-soluble esters of polycarboxy acids with a polyoxyalkylene glycol mixture consisting of a product which statistically represented has a plurality of alternating hydrophobic and hydrophilic polyoxyalkylene chains or segments, the hydrophilic chains (segments) consisting of oxyethylene radicals linked one to the other and the hydrophobic chains (segments) consisting of radicals selected from the group consisting of oxypropylene and oxybutylene radicals linked one to the other, each such chain (segment) containing at least 2 and not more than 110 oxyalkylene radicals, said statistically represented product having an odd number of such chains (segments) linked together so that it consists of a series of alternating hydrophile and hydrophobe chains (segments) with the proviso that it contain a total of at least three hydrophobe chains (segments) and at least two hydrophile chains (segments), with the further proviso that there be not more than fifteen such chains (segments), and with the final proviso that at least one internal hydrophile chain (segment) contain at least 5 oxyethylene radicals and that the molecular weight of the polyoxyalkylene glycol mixture be at least 1000.

The above described polyoxyalkylene glycol mixtures, which are the subject matter of my copending application Serial No. 677,907, filed August 13, 1957, are built up from either a hydrophilic or a hydrophobic glycol nucleus by successive oxyalkylation with the appropriate alkylene oxide. Thus they are obtained, when the nucleus is hydrophilic, by the oxypropylation or oxybutylation or both of a polyethylene glycol, which introduces two hydrophobic segments, followed by oxyethylation, which introduces two hydrophilic segments, and further oxypropylation, oxybutylation or both, which introduces two more hydrophobic segments. When the nucleus is hydrophobic, the mixtures are obtained by the oxyethylation of a polypropylene glycol or a polybutylene glycol or a mixed polypropylene-polybutylene glycol, which introduces two hydrophilic segments, followed by oxypropylation or oxybutylation or both, which introduces two hydrophobic segments. Additional pairs of alternate hydrophilic and/or hydrophobic segments can be added by further oxyalkylation with the appropriate alkylene oxide. The initial glycol representing the nucleus is the addition product of one mole of water and at least 2 and not over 110 moles of the appropriate alkylene oxide. Each oxyalkylation step, moreover, must be carried out with at least 4 and not more than 220 molar proportions of the appropriate alkylene oxide, in terms of the initial mole of water or glycol, in order to introduce at least 2 and not more than 110 oxyalkylene radicals in each chain or segment. Further, there must be present at least one internal, i.e., other than terminal, hydrophile chain or segment containing at least five oxyethylene radicals.

Where both propylene and butylene oxides are employed in a single oxyalkylation step, they can be added stepwise or as a mixture.

The present invention is primarily concerned with the preparation of new, novel, and useful esters of glycol mixtures where the final properties of the materials are controlled at least in part, and in any event significantly, by the introduction of hydrophilic segments internally into the otherwise hydrophobic polyalkylene glycol. Rather than being ineffective in the determination of final properties, it has been found that the internal hydrophilic segments can be used to control the final properties of the cogeneric mixtures so that new, novel, and eminently useful materials are produced. It is one purpose of this invention to set forth means whereby a class of new and novel cogeneric mixtures may be obtained with specifically controlled and predetermined properties so as to make them of greatly enhanced usefulness for a wide range of purposes.

The products of this invention have been defined statistically and are often referred to as cogeneric mixtures. This is for the reason that if one selects any hydroxylated compound and subjects it to oxyalkylation, particularly where the amount of oxide added is comparatively large, for example 30 units of ethylene oxide, it is well known that one does not obtain a single constituent such as $RO(C_2H_4O)_{30}H$. Instead, one obtains a cogeneric mixture of closely related homologous compounds in which the formula may be shown as the following:

$$RO(C_2H_4O)_xH$$

wherein $x$, as far as the statistical average goes, is 30, but the individual members present in significant amount may vary from compounds where $x$ has a value of 25 and perhaps less, to a point where $x$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

What has been said in regard to a monohydric compound is of course multiplied many times in the case of a glycol. Accordingly, in the above statistical representation the number of oxyalkylene radicals in each chain or segment other than the nucleus, as far as the statistical average goes, corresponds to one-half the number of alkylene oxide units, i.e., the number of units of ethylene, propylene and/or butylene oxide, introduced during the particular oxyalkylation step when that particular chain or segment was formed.

For purpose of convenience, what is said hereinafter will be divided into six parts.

Part 1 is concerned with polyoxyalkylene glycols suitable for use as initial reactants.

Part 2 has three subdivisions.

Subdivision A describes the oxyethylation of polypropylene glycols and polybutylene glycols and the oxybutylation and oxypropylation of the respective intermediates to provide final products having three hydrophobic segments and two hydrophilic segments and having a nucleus composed of hydrophobic radicals different from those of the terminal hydrophobic segments.

Subdivision B describes the stepwise successive reaction of polypropylene glycols with ethylene oxide, propylene oxide and ethylene oxide to provide final products having three hydrophobic segments and four hydrophilic segments.

Subdivision C describes the preparation of more highly segmented products having alternating hydrophilic and hydrophobic segments in which the hydrophobic segments consist of oxypropylene radicals, oxybutylene radicals and mixed oxypropylene-oxybutylene radicals.

Part 3 is concerned with a description of suitable polycarboxy acids, particularly dicarboxy acids, employed as reactants.

Part 4 is concerned with the reaction involving the glycols and the polycarboxy acids, particularly the dicarboxy acids.

Part 5 is concerned with the use of the final products in the resolution of petroleum emulsions of the water-in-oil type.

Part 6 is concerned with some of the other more important industrial applications wherein the final products can be most advantageously utilized.

PART 1

As stated above, one class of products of this invention is obtained from intermediates prepared by the oxypropylation or oxybutylation, or both, of an initial polyoxyethylene glycol, which glycol is the addition product of one mole of water and at least 2, and not over 110 moles of ethylene oxide. Thus, for all practical purposes, the parent glycols represent not only ethylene glycol, diethylene glycol, triethylene glycol, tetraethylene glycol, pentaethylene glycol, hexaethylene glycol, and heptaethylene glycol, but also the higher range of polyethylene glycols up to the point where approximately 110 moles of ethylene oxide have been combined with one mole of water. In other words, the range up to approximately 4,800 molecular weight.

As is well known, ethylene glycol, diethylene glycol and triethylene glycol are obtainable both in the laboratory and commercially as materials of technical purity, as differentiated from mixtures.

Tetraethylene glycol can be obtained in technically pure form, but this represents a more expensive reactant if separated from its cogeners. Actually the form of this product most readily available on a commercial scale is polyethylene glycol 200 which represents principally a mixture of glycols, to produce a mole of which a mole of water and 4 moles or 5 moles of ethylene oxide have been combined, i.e., it is a mixture of tetraethylene glycol and pentaethylene glycol.

Another polyethylene glycol commercially available represents a mixture having approximately 6 or 7 ethylene oxide units in the molecule. This material is sold commercially as polyethylene glycol 300.

The average molecular weight of polyethylene glycol 200 runs from 190 to 210. The average molecular weight of polyethylene glycol 300 runs from 285 to 315.

Some manufacturers furnish, if specified, a product referred to as "polyethylene glycol 200 minus" or "polyethylene glycol 300 minus." In both instances the molecular weights are about one-eighth less than the usual average indicated above. Any such glycols can be readily prepared if desired.

There are available commercially a variety of polyethylene glycols whose molecular weights come within the range herein specified. The lower members of the series are liquids and the higher molecular weight members are waxy solids. In general these materials are soluble in water, being less soluble in hot water than in cold water. These include products such as polyethylene glycol 400, polyethylene glycol 600, polyethylene glycol 1000, polyethylene glycol 1500, etc.

The preferred initial starting materials for the manufacture of the herein disclosed products are the lower molecular range polyethyleneglycols or cogeneric mixtures of the same. This applies not only to the range of 200, 300 and 400, but also up to the range to which approximately 14 up to 20, 22, or 23 moles of ethylene oxide have been added to one mole of water. In other words, the range up to the molecular weight just short of 1000. If a polyethylene glycol of the appropriate chain length is not available, one may select an available polyethylene glycol of lower chain length and treat it with ethylene oxide in the presence of an alkaline or other suitable catalyst to produce a material of the desired molecular weight. The process for the production of polyethylene glycols by the addition of ethylene oxide to water or a glycol are well known to the art.

Actually, as is well known, when one prepares even lower molecular weight glycols, for instance, tetraethyleneglycol, pentaethyleneglycol, hexaethyleneglycol, heptaethyleneglycol, decaethyleneglycol, etc., one obtains a cogeneric mixture from which it is difficult or impossible or expensive to separate the single glycol. Indeed, this is true of even the simplest oxyalkylation as, for example, the oxyalkylation of a monohydric alcohol. Reference is made to U.S. Patent No. 2,679,513, dated May 25, 1954, to De Groote, with particular reference to columns 19 and 20 thereof.

It is understood, of course, that polyethylene glycols may be synthesized by other means than the reaction of ethylene oxide. For example, ethylene carbonate, which is available commercially, can be used in place of ethylene oxide. For special purposes where particularly pure materials are desired or where exact molecular configurations are wanted, any of a number of well known etherification reactions may be employed. However, for most commercial processes where economy is of chief importance treatment with ethylene oxide is employed. For the purposes of this invention any polyethylene glycol of the general formula:

$$HO-(C_2H_4O)_xH$$

where $x$ is at least 2 and not over 110 can be employed.

Another class of products of this invention is obtained from intermediates prepared by the oxyethylation of an initial polyoxypropylene glycol, a polyoxybutylene glycol or a mixed glycol containing both oxypropylene and oxyethylene radicals.

The manufacture of propyleneglycol and polypropyleneglycol is well known. One procedure, of course, is to simply oxypropylate water so as to obtain the polypropyleneglycol of the desired molecular weight. However, one need not start with water and one can start with a low molal water-soluble glycol, for instance, propylene di-propylene or tripropyleneglycol.

If desired one can purchase the polypropylene glycol in the open market. For instance, one manufacturer regularly manufactures polypropyleneglycol within the following three molecular weight classes, to wit, 400–450; 975–1075; and 1950 to 2100. Higher molecular weights are also available as, for example, at least one product having a molecular weight of approximately 2750 or thereabouts. Thus, if desired one can purchase a suitable polypropyleneglycol and not resort to oxypropylation at all.

For reasons which have been stated previously, two or three different manufacturers may furnish a polypropyleneglycol 1200 or 1500, or 2000, or the like, and although they are substantially the same there is a slight variation in composition. The reason is due to at least two factors. As pointed out previously one does not get a single product but one obtains cogeneric mixtures whose average composition corresponds to the molecular weight indicated. For instance, one manufacturer of a polypropyleneglycol whose average molecular weight is 1025 states the molecular weight in fact varies from 975 to 1075 and similarly in the case of a product whose average molecular weight is 2025 the variation runs from 1950 to 2100. Depending on the catalyst used, the rate of reaction and other factors the variation may be even somewhat wider, for instance, 1025 to 1125 in one case, and 1900 to 2150 in another case. The other factor is one that has been pointed out a number of times and particularly in a series of articles dealing with derivatives of propylene oxide. See "Les Dérives de l'Oxyde de Propylene," Parts I, II and III, Industrie Chimique, volume 40, 1953, pages 221–9, 249–58, and 281–6.

Since propyleneglycol has both a primary alcohol and a secondary alcohol radical and since one can look upon polypropyleneglycols as polymeric linear condensation derivatives of propylene oxide, it is obvious one could obtain head-to-head polymerization, tail-to-tail polymerization, and head-to-tail polymerization. This is illustrated by the fact that there are three dipropyleneglycols. If one goes to tripropyleneglycol there are theoretically at least eight possibilities. In the higher polypropyleneglycols these possibilities increase enormously. Thus, the first variation is in the breadth of the molecular weight spectrum or range which determines the average molecular weight and the second variation is concerned with the fact that dependent on the method of oxypropylation employed, and various factors such as catalyst used, temperature, pressure, speed of reaction, etc., there may be variations in the actual structure. For this reason solubility in water must be interpreted in light of such fact and, thus, although polypropyleneglycol of an average molecular weight of 1000 or thereabouts may show solubility of about 1.5% in water actually this may be the solubility of some of the low molal cogeners. Thus, it is customary to consider polypropyleneglycols having a molecular weight of 1,000 or more as being substantially water-insoluble. Such customary use is herein included. Even if the molecular weight is double, up to 2000 or thereabout, there may even be a trace of the glycol which is water soluble, for instance, somewhere in the neighborhood of .015%.

Similarly the manufacture of butylene glycol and polybutylene glycol is well known. Again one can oxybutylate water but it is my preference to oxybutylate a butyleneglycol, particularly the 1,4-butyleneglycol. In all of the subsequent examples, where reference is made to butylene glycol, 1,4-butyleneglycol was employed.

At the present time there is available butylene oxide which includes isomeric mixtures. For instance, one manufacturer has previously supplied a mixed butyleneoxide which is in essence a mixture of 1-butene oxide, 2-butene oxide isomers and approximately 10% isobutylene oxide. Another manufacturer has supplied an oxide which is roughly a fifty-fifty mixture of the cis- and trans-isomers of 2-butene oxide.

There is also axailable a butylene oxide which is characterized as straight chain isomers being a mixture of the 1,2 and the 2,3 isomers and substantially free from the isobutylene oxide.

This latter product appears to consist of 80% of the 1,2 isomer and 15% of the mixed 2,3 cis- and 2,3 trans-isomer. I have obtained the best results by using an oxide that is roughly 80% or more of the 1,2 isomer and with either none, or just a few percent if any, of the isobutylene oxide, the difference being either form of the 2,3 or a mixture of the two forms.

My preference is to use an oxide substantially free from the isobutylene oxide, or at least having minimum amounts of isobutylene oxide present.

Since the varying solubility of different butanols is well known, it is unnecessary to comment on the effect that the varying structure has on solubility of derivatives obtained by butylene oxide. Purely by way of example, I have tested the solubility of the first two available butylene oxides and noted in one instance that the butylene oxide would dissolve to the extent of 23 grams in 100 grams of water, whereas the other butylene oxide would only dissolve to the extent of 6 grams in 100 grams of water. These tests were made at 25° C.

As to further reference in regard to the isomeric butylene oxides see "Chemistry of Carbon Compounds," volume I, Part A, "Aliphatic Compounds," edited by E. H. Rodd, Elsevier Publishing Company, New York, 1951, page 671.

As to the difference in certain proportions of the cis- and trans-form of straght chain isomers 2,3-epoxybutane see page 341 of "A Manual of Organic Chemistry," volume 1, G. Malcom Dyson, Longmans, Green and Company, New York, 1950.

Reference to butylene oxide herein of course is to the compound or compounds having the oxirane ring and thus excludes 1,4-butylene oxide (tetrahydrofurane) or a trimethylene ring compound.

When reference is made to butylene oxide, one can use the corresponding carbonate. Butylene carbonate, or the carbonate corresponding to a particular oxide, is not available commercially but can be prepared by the usual methods in the laboratory.

In the present invention I have found that outstanding products are obtained by the use of certain preferred butylene oxides, i.e., those entirely free or substantially free from isobutylene oxide (usually 1% or less) and composed of approximately 85% or more of the 1,2-isomer with the remainder, if any, being the 2,3-isomer.

In the preparation of the compounds of this invention I have studiously avoided the presence of the isobutylene oxide as far as practical. When any significant amount of isobutylene oxide happens to be present, the results are not as satisfactory regardless of the point when the butylene oxide is introduced. One explanation may be the following. The initial oxybutylation which may be simplified by reference to a monohydric alcohol, produces a tertiary alcohol. Thus the oxybutylation in the presence of an alkaline catalyst may be shown thus:

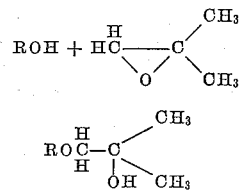

Further oxyalkylation becomes difficult when a tertiary alcohol is involved although the literature records successful oxyalkylation of tertiary alcohols. This does not necessarily apply when oxyalkylation takes place in the presence of an acidic catalyst, for instance, a metallic chloride such as ferric chloride, stannic chloride, aluminum chloride, etc.

In regard to certain difficulties involved in the oxybutylation by means of isobutylene oxide one explanation is that isobutylene oxide may show a tendency to revert back to isobutylene and oxygen and this oxygen may tend to oxidize the terminal hydroxyl radicals. This possibility is purely a matter of speculation, but may account for the reason I obtain much better results using a butylene oxide as specified. In regard to this reaction, i.e., possible conversion of an alkylene oxide back to the olefin and nascent oxygen, see "Tall Oil Studies II. Decolorization of Polyethenoxy Tallates with Ozone and Hydrogen Peroxide," J. V. Karabinos et al., J. Am. Oil Chem. Soc. 31, 71 (1954).

Mixed glycols containing both oxypropylene radicals and oxybutylene radicals can be prepared by the successive reaction of water with propylene and butylene oxides in either order, by the oxybutylation of a propylene glycol or by the oxypropylation of a butylene glycol.

The following examples illustrate the preparation of such mixed glycols.

*Example A*

6.57 pounds of butylene glycol (equivalent to 5.25 pounds of butylene oxide) and .5 pound of powdered caustic soda were placed in an autoclave of 25 gallons capacity. The autoclave was flushed with nitrogen, heated to 100° C., and then placed under vacuum to remove any nitrogen and any moisture. It was agitated at approximately 350 r.p.m., with temperature raised to 125–130° C. before starting to add the 94.7 pounds of propylene oxide. It was added over a period of 3½ hours.

The reaction temperature was left within the range of 125–130° C. The pressure was kept at approximately 10 to 15 pounds per square inch. The time required for complete oxyalkylation was one-half hour additional. At the end of this period reaction was complete and vacuum again noted on the reactor. The molecular weight of the product was 1400.

*Example B*

13.15 pounds of butyleneglycol (equivalent to 10.5 pounds of butylene oxide) were mixed with .5 pound caustic soda and then reacted with 10.5 pounds of butylene oxide, followed by reaction with 79 pounds of butylene oxide, followed by reaction with 79 pounds of propylene oxide, molecular weight was 1340.

PART 2

Subdivision A

In this subdivision the preparation of products having three hydrophobic polyoxyalkylene segments and two hydrophilic polyoxyalkylene segments is described. The products have a hydrophobic nucleus and terminal hydrophobic radicals derived from a different alkylene oxide than is the nucleus. They are prepared by the reaction of a polypropylene or polybutylene glycol with at least ten molar proportions of ethylene oxide followed by oxypropylation or oxybutylation, depending on the initial polyglycol reactant, of the intermediate with at least four molar proportions of propylene oxide or butylene oxide.

The oxyalkylation of various glycols with various oxides and particularly alpha-beta olefinic oxides having 4 carbon atoms or less, has been described in the literature. This applies particularly to oxyethylation, oxypropylation and oxybutylation. Instead of using ethylene oxide one can, of course, use ethylene carbonate. Similarly, one could use propylene carbonate or butylene carbonate.

As is well known the oxyalkylation derivatives of any oxyalkylation-susceptible compound are prepared by the addition reaction between the alkylene oxide and such a compound. The addition reaction is advantageously carried out at an elevated temperature and pressure and in the presence of a small amount of alkaline catalyst. Usually, the catalyst is sodium hydroxide or sodium methylate. Metallic sodium, with the prior elimination of hydrogen (formation of an alkoxide) can be used. The reaction temperature is apt to be 150° C., or somewhat less, and the reaction pressure is not in excess of 30 to 60 pounds per square inch. The reaction proceeds rapidly. Actually, there is little difference between the use of propylene oxide and ethylene oxide or, for that matter straight chain butylene oxide. See, for example, U.S. Patent No. 2,636,038, dated April 21, 1953, to Brandner, although another hydroxylated compound is there employed.

As to further information in regard to the mechanical steps involved in oxyalkylation, see U.S. Patent No. 2,499,365, dated March 7, 1950, to De Groote et al. Particular reference is made to columns 92 et seq. thereof.

The oxyalkylation of a liquid or a product which is liquid at ordinary temperature and particularly at oxyalkylation temperatures is comparatively simple and this is true also where both hydroxyls are primary hydroxyls, as in the case of the alkylene glycols. Thus one can do either one of two things: mix the glycol or polyglycol with a suitable solvent such as xylene or a high boiling aromatic solvent so as to produce a solution or suspension, or else simply melt the product so that it is liquid prior to introduction of the oxide. My preference is simply to mix the product with a suitable amount of a selected catalyst, such as powdered caustic soda or powdered sodium methylate. The amount of catalyst may vary from 1% to 5%. The reaction vessel is flushed out, the temperature raised to an appropriate point, and oxyalkylation proceeds in the customary manner. In any event, whether one adds a solvent or suspending medium or merely melts the product, it is immaterial because at a very early stage the material becomes a liquid and becomes homogeneous by solution or dispersion. The following examples illustrate the preparation of the type of product of my invention described above. In the examples, the designation "AA" means that the compounds were obtained by initially reacting a polybutylene glycol with ethylene oxide. The designation "BB" means that the compounds were obtained by initially reacting a polypropyleneglycol with ethylene oxide.

*Example AA–1*

10 pounds of butyleneglycol (equivalent to 8 pounds of butylene oxide) and .5 pound caustic soda were placed in an autoclave of 25 gallons capacity. The autoclave was flushed with nitrogen, heated to 100° C., and then placed under vacuum to remove any nitrogen and any moisture. It was agitated at approximately 350 r.p.m., with temperature raised to 125–130° C. before starting to add the 42 pounds of butylene oxide (straight chain isomer). It was added over a period of 3½ hours. The reaction temperature was left within the range of 125–130° C. The pressure was kept at approximately 10–15 pounds per square inch. The time required for complete oxyalkylation was one-half hour additional. At the end of this period reaction was complete and vacuum again noted on the reactor.

The reaction was again started with 50 pounds of ethylene oxide being used during a second oxyalkylation step. The time period, operating conditions as far as temperature and pressure were concerned, all were substantially the same as in the preceding part.

The mixed polyglycol ether so obtained was reserved for further reaction. Molecular weight was 918.

*Example AA–2*

10 pounds of butylene glycol and 0.5 pound of caustic soda were employed as in Example AA–1, preceding but reacted with only .7 pound of butylene oxide. The operating conditions in a general way were the same as in the previous example, and this is true of all succeeding examples. After adding the .7 pound of butylene oxide without interruption the butylene oxide line was shut off and ethylene oxide equivalent to 91.3 pounds was added. The time required was 5¾ hours. Molecular weight was 918.

*Example AA–3*

22.5 pounds of butylene glycol were employed as the raw material along with 1.0 pound of caustic soda. Operating conditions were substantially the same as in previous examples. 12.8 pounds of butylene oxide were added and without interruption as soon as the butylene oxide was in, 69.2 pounds of ethylene oxide were added. Molecular weight is 418.

*Example BB–2*

Using a 50 gallon autoclave, 38 pounds of propyleneglycol (equivalent to 29.3 pounds of propylene oxide) mixed with 5.5 pounds of caustic soda, were reacted with 225.7 pounds of propylene oxide followed by reaction with 332.4 pounds of ethylene oxide. Molecular weight was 1200.

Simply for convenience, Table I following gives the conversion factor for converting the more common glycols into the equivalent amount of alkylene oxide. For instance, if one starts with one pound of ethylene glycol, it would be the equivalent of .71 pound of ethylene oxide. Similarly, if one started with 10 pounds of dipropyleneglycol it would be the equivalent of 8.7 pounds of propylene oxide. If one started with 100 pounds of butylene glycol it would be the equivalent of 80 pounds of butylene oxide. Note the ratios in Table I give these conversion factors. Thus in Example AA–1, 10 pounds of butylene glycol were combined with 92 pounds of alkylene oxide. The total weight of the final reaction product was 102 pounds. The ratio of 102/10 gives a factor of 10.2 which, when multiplied by the molecular weight of 90 for butyleneglycol, gives the average molecular weight of the reaction product based on completeness of reaction, as 918.

The same procedure as in Examples AA-1 and BB-2 was followed in making various combinations as indicated in Table II. These two-component reaction products (in reality a three-component reaction mass if one includes water) were then subjected to reaction to give the three-component (or four-component) reaction products described subsequently and shown in Table III.

Whether to consider the reaction mass a three-component derivative or a four-component derivative depends entirely on the convenience of whether or not to include a single molecule of water per mole of polyglycol ether which may vary from 1000 molecular weight to 4,150 molecular weight or even higher.

For purpose of characterization in terms of the initial oxides used as reactants, it is best to employ a three-component system, bearing in mind that water stays constant as one molecule per molecule of glycol ether. However, in calculating molecular weight, the one mole of water is not only important, but in fact, controlling.

TABLE I

| | Molecular weight | Factor to convert to ethylene oxide | Factor to convert to propylene oxide | Factor to convert to butylene oxide |
|---|---|---|---|---|
| Ethyleneglycol | 62 | 0.71 | | |
| Diethyleneglycol | 106 | 0.83 | | |
| Triethyleneglycol | 150 | 0.88 | | |
| Tetraethyleneglycol | 194 | 0.91 | | |
| Pentaethyleneglycol | 238 | 0.92 | | |
| Hexaethyleneglycol | 282 | 0.94 | | |
| Propyleneglycol | 76 | | 0.77 | |
| Dipropyleneglycol | 134 | | 0.87 | |
| Tripropyleneglycol | 192 | | 0.91 | |
| Tetrapropyleneglycol | 250 | | 0.93 | |
| Pentapropyleneglycol | 308 | | 0.94 | |
| Hexapropyleneglycol | 366 | | 0.95 | |
| Butyleneglycol | 90 | | | 0.80 |
| Dibutyleneglycol | 162 | | | 0.89 |
| Tributyleneglycol | 234 | | | 0.92 |
| Tetrabutyleneglycol | 306 | | | 0.94 |
| Pentabutyleneglycol | 378 | | | 0.95 |
| Hexabutyleneglycol | 450 | | | 0.95 |

The intermediate reaction products of the two oxides in terms of the weight percent of the respective oxides in the intermediates are tabulated in Table II, immediately following:

TABLE II

| Example number | Oxyethylated polybutyleneglycol | | Example number | Oxyethylated polypropyleneglycol | |
|---|---|---|---|---|---|
| | Weight percent BuO | Weight percent EtO | | Weight percent PrO | Weight percent EtO |
| AA-1 | 50.0 | 50.0 | BB-1 | 94.75 | 5.25 |
| AA-2 | 8.7 | 91.3 | BB-2 | 44.6 | 55.4 |
| AA-3 | 30.8 | 69.2 | BB-3 | 43.7 | 56.3 |
| AA-4 | 80.0 | 20.0 | BB-4 | 93.75 | 6.25 |
| AA-5 | 33.4 | 66.6 | BB-5 | 89.5 | 10.5 |
| AA-6 | 66.6 | 33.4 | BB-6 | 87.5 | 12.5 |
| AA-7 | 20.0 | 80.0 | BB-7 | 79.0 | 21.0 |
| AA-8 | 50.0 | 50.0 | BB-8 | 75.0 | 25.0 |
| AA-9 | 14.3 | 85.7 | BB-9 | 68.4 | 31.6 |
| AA-10 | 40.0 | 60.0 | BB-10 | 62.5 | 37.5 |
| AA-11 | 11.1 | 88.9 | BB-11 | 57.8 | 42.2 |
| AA-12 | 33.4 | 66.7 | BB-12 | 50.0 | 50.0 |
| AA-13 | 25.8 | 74.2 | BB-13 | 45.3 | 54.7 |
| AA-14 | 15.4 | 84.6 | BB-14 | 52.2 | 47.8 |
| AA-15 | 31.6 | 68.4 | BB-15 | 54.0 | 46.0 |
| AA-16 | 13.5 | 86.5 | BB-16 | 55.7 | 44.3 |
| AA-17 | 29.2 | 70.8 | BB-17 | 60.4 | 39.6 |
| AA-18 | 27.2 | 72.8 | BB-18 | 63.6 | 36.4 |
| AA-19 | 18.1 | 81.9 | BB-19 | 63.6 | 36.4 |
| AA-20 | 39.6 | 60.4 | BB-20 | 68.6 | 31.4 |
| AA-21 | 31.6 | 68.4 | BB-21 | 70.4 | 29.6 |
| AA-22 | 35.2 | 64.8 | BB-22 | 75.0 | 25.0 |
| AA-23 | 77.3 | 22.7 | BB-23 | 72.4 | 27.6 |
| AA-24 | 54.7 | 45.3 | BB-24 | 82.4 | 17.6 |
| AA-25 | 44.5 | 55.5 | BB-25 | 83.0 | 17.0 |
| AA-26 | 33.4 | 66.6 | BB-26 | 83.8 | 16.2 |
| AA-27 | 64.3 | 35.7 | BB-27 | 91.32 | 8.68 |
| AA-28 | 46.6 | 53.4 | BB-28 | 91.4 | 8.6 |

In the following Table III, the intermediates of Table II have been reacted with propylene oxide or butylene oxide in the indicated proportions by weight to give the final products having three hydrophobic segments and two hydrophilic segments.

TABLE III

| Intermediate | Parts by weight | Parts by weight added PrO | Intermediate | Parts by weight | Parts by weight added BuO |
|---|---|---|---|---|---|
| AA-1 | 10 | 90.0 | BB-1 | 95 | 5.0 |
| AA-2 | 57.5 | 42.5 | BB-2 | 95 | 5.0 |
| AA-3 | 65 | 35.0 | BB-3 | 80 | 20.0 |
| AA-4 | 25 | 75.0 | BB-4 | 80 | 20.0 |
| AA-5 | 15 | 85.0 | BB-5 | 95 | 5.0 |
| AA-6 | 30 | 70.0 | BB-6 | 80 | 20.0 |
| AA-7 | 25 | 75.0 | BB-7 | 95 | 5.0 |
| AA-8 | 40 | 60.0 | BB-8 | 80 | 20.0 |
| AA-9 | 35 | 65.0 | BB-9 | 95 | 5.0 |
| AA-10 | 50 | 50.0 | BB-10 | 80 | 20.0 |
| AA-11 | 45 | 55.0 | BB-11 | 95 | 5.0 |
| AA-12 | 60 | 40.0 | BB-12 | 80 | 20.0 |
| AA-13 | 62 | 38.0 | BB-13 | 84 | 16.0 |
| AA-14 | 52 | 48.0 | BB-14 | 92 | 8.0 |
| AA-15 | 55.5 | 44.5 | BB-15 | 82.5 | 17.5 |
| AA-16 | 48 | 52.0 | BB-16 | 93.5 | 6.5 |
| AA-17 | 48 | 52.0 | BB-17 | 86 | 14.0 |
| AA-18 | 44 | 56.0 | BB-18 | 88 | 12.0 |
| AA-19 | 41.5 | 58.5 | BB-19 | 92.5 | 7.5 |
| AA-20 | 43 | 57.0 | BB-20 | 83 | 17.0 |
| AA-21 | 38 | 62.0 | BB-21 | 88 | 12.0 |
| AA-22 | 34 | 66.0 | BB-22 | 88 | 12.0 |
| AA-23 | 33 | 67.0 | BB-23 | 92.5 | 7.5 |
| AA-24 | 32 | 68.0 | BB-24 | 82.5 | 17.5 |
| AA-25 | 27 | 73.0 | BB-25 | 88 | 12.0 |
| AA-26 | 22.5 | 77.5 | BB-26 | 92.5 | 7.5 |
| AA-27 | 21 | 79.0 | BB-27 | 86.5 | 13.5 |
| AA-28 | 15 | 85.0 | BB-28 | 93 | 7.0 |

Further examples are shown in Table IV in which one pound mole of butylene glycol (equal to 18 pounds of water and 72 pounds of butylene oxide) was successively reacted with butylene, ethylene and propylene oxides in the amounts indicated. The first two of these products have the proportions by weight of the final product in Table III made by oxypropylating intermediate AA-2. The last three of these products have the proportions by weight of the final product in Table III made by oxypropylating intermediate AA-14.

TABLE IV

| Example number | Butylene glycol/lbs. | Butylene oxide/lbs. | Ethylene oxide/lbs. | Propylene oxide/lbs. | Molecular weight fo product |
|---|---|---|---|---|---|
| AA-29 | 90 | 78 | 1,575 | 1,275 | 3,018 |
| AA-30 | 90 | 128 | 2,100 | 1,300 | 4,018 |
| AA-31 | 90 | 152 | 880 | 960 | 2,018 |
| AA-32 | 90 | 232 | 1,320 | 1,440 | 3,018 |
| AA-33 | 90 | 312 | 1,760 | 1,920 | 4,018 |

Further examples of glycols having three hydrophobic polyoxyalkylene segments and two hydrophilic polyoxyethylene segments are represented as points on the graphs of FIGURES 1 through 4 of my co-pending application Serial No. 677,907, filed August 13, 1957. A representative number of these glycols are set forth in tabular form below:

TABLE V

| Ex. No. | PrO in initial glycol, moles | EtO added, moles | PrO added, moles | BuO added, moles | Mol. weight of product excluding ml. H₂O |
|---|---|---|---|---|---|
| AA-34 | 15 | 20 | 25 | | 3,200 |
| AA-35 | 15 | 20 | 35 | | 3,780 |
| AA-36 | 15 | 20 | 50 | | 4,650 |
| AA-37 | 18.7 | 37.5 | 5 | | 3,025 |
| AA-38 | 18.7 | 37.5 | 15 | | 3,605 |
| AA-39 | 18.7 | 37.5 | 35 | | 4,765 |
| AA-40 | 28 | 150 | 5 | | 8,514 |
| AA-41 | 28 | 150 | 10 | | 8,804 |
| AA-42 | 28 | 150 | 30 | | 9,964 |
| AA-43 | 28 | 150 | 50 | | 11,124 |
| AA-44 | 6 | 30 | | 20 | 3,108 |

TABLE VI

| Ex. No. | BuO in initial glycol, moles | EtO added, moles | PrO added, moles | BuO added, moles | Mol. weight of product excluding ml. H₂O |
|---|---|---|---|---|---|
| AA-45 | 5 | 15 | 5 | | 1,310 |
| AA-46 | 4 | 15 | 20 | | 2,108 |
| AA-47 | 7 | 10 | | 5 | 1,304 |
| AA-48 | 7 | 10 | | 10 | 1,664 |

In the above tables, the amounts employed were gram-moles.

*Subdivision B*

In this subdivision the preparation of products having three hydrophobic polyoxyalkylene segments and four hydrophilic polyoxyalkylene segments in which the hydrophobic segments are all derived from propylene oxide is described. The products have a hydrophobic nucleus and are obtained by the successive reaction of a polypropylene glycol with at least four molar proportions of first ethylene oxide, then propylene oxide, and then ethylene oxide, provided that one oxyethylation step is carried out with at least ten molar proportions of ethylene oxide.

The preparation of the polyalkyleneglycols described in this subdivision can be a continuous process in which water, propylene glycol, or a low molal polypropyleneglycol is oxypropylated by means of any suitable catalyst, either acid or alkaline, and then subjected to oxyethylation, followed by oxypropylation. Instead of being a single step process one can employ a two step process in which the oxyethylated intermediate is subsequently oxypropylated. For convenience the two step process will be described but it is obvious the two step process may be merged into a single step. One reason for doing so is the fact that oxyethylated propyleneglycols are available in the open market, or manufacturers can furnish such intermediates which are particularly satisfactory for use as a reactant.

In the examples set forth in Table V, immediately following, the polypropyleneglycol employed had a molecular weight of about 2920. It was obtained as the equivalent of reacting one mole of water with 50 moles of propylene oxide. It was then reacted with from 10 to 15 moles of ethylene oxide. Table VII gives the data in complete form covering these oxyethylated polypropyleneglycols which were obtained by conventional procedures using an alkaline catalyst. The molecular weight, including the initial mole of water, is shown. Also the weight percentage of the two oxides in the reaction product ignoring the initial mole of water is shown.

TABLE VII

| Ex. No. | Propylene oxide moles | Ethylene oxide moles | Molec. weight contributed by PrO | Molec. weight contributed by EtO | Ignoring initial mole of water | | Including initial mole of water |
|---|---|---|---|---|---|---|---|
| | | | | | Percent PrO | Percent EtO | |
| 1b | 50 | 10 | 2,900 | 440 | 86.83 | 13.17 | 3,358 |
| 2b | 50 | 11 | 2,900 | 484 | 85.70 | 14.30 | 3,402 |
| 3b | 50 | 12 | 2,900 | 528 | 84.60 | 15.40 | 3,446 |
| 4b | 50 | 13 | 2,900 | 572 | 83.52 | 16.48 | 3,490 |
| 5b | 50 | 14 | 2,900 | 616 | 82.47 | 17.53 | 3,534 |
| 6b | 50 | 15 | 2,900 | 660 | 81.47 | 18.53 | 3,478 |

The oxyethylated polypropyleneglycols of the kind exemplified in the examples of Table VII are next subjected to reaction with propylene oxide.

The use of propylene oxide has been widely described in the literature particularly in the oxyalkylation of alcohols, either monohydric or polyhydric, and information is furnished freely by the several manufacturers of propylene oxide as to its use in oxyalkylation.

Either acid or alkaline catalysts can be used. Briefly stated, various oxyethylated polypropyleneglycols, either purchased in the open market or prepared according to the examples of Table VII, can be re-subjected to oxypropylation so as to give products comparable to those described in Table VIII, immediately following. In Table VIII, the initial reactants indicated as 1b, 2b, etc. are the products of the reactions described in Table VII.

TABLE VIII

| Ex. No. | Oxyethylated polypropyleneglycol | | Ignoring initial mole of water | | Moles of PrO added by second oxyalkylation step | Final oxypropylated derivative | | |
|---|---|---|---|---|---|---|---|---|
| | | | | | | Ignoring initial mole of water | | Molec. weight including 1 mol. H₂O |
| | Ex. No. | Molec. weight | Percent PrO | Percent EtO | | Percent PrO | Percent EtO | |
| 1c | 1b | 3,358 | 86.83 | 13.17 | 10 | 88.79 | 11.21 | 3,938 |
| 2c | 1b | 3,358 | 86.83 | 13.17 | 20 | 90.22 | 9.78 | 4,518 |
| 3c | 1b | 3,358 | 86.83 | 13.17 | 30 | 91.34 | 8.66 | 5,098 |
| 4c | 2b | 3,402 | 85.70 | 14.30 | 11 | 87.97 | 12.03 | 4,040 |
| 5c | 2b | 3,402 | 85.70 | 14.30 | 22 | 89.61 | 10.39 | 4,678 |
| 6c | 2b | 3,402 | 85.70 | 14.30 | 33 | 90.86 | 9.14 | 5,316 |
| 7c | 3b | 3,446 | 84.60 | 15.40 | 12 | 87.20 | 12.80 | 4,142 |
| 8c | 3b | 3,446 | 84.60 | 15.40 | 24 | 89.05 | 10.95 | 4,838 |
| 9c | 3b | 3,446 | 84.60 | 15.40 | 36 | 90.42 | 9.58 | 5,534 |
| 10c | 4b | 3,490 | 83.52 | 16.48 | 13 | 86.46 | 13.54 | 4,244 |
| 11c | 4b | 3,490 | 83.52 | 16.48 | 26 | 88.51 | 11.49 | 4,998 |
| 12c | 4b | 3,490 | 83.52 | 16.48 | 39 | 90.02 | 9.98 | 5,752 |
| 13c | 5b | 3,534 | 82.47 | 17.53 | 14 | 85.78 | 14.22 | 4,346 |
| 14c | 5b | 3,534 | 82.47 | 17.53 | 28 | 88.02 | 11.98 | 5,158 |
| 15c | 5b | 3,534 | 82.47 | 17.53 | 42 | 89.65 | 10.35 | 5,970 |
| 16c | 6b | 3,578 | 81.47 | 18.53 | 15 | 85.10 | 14.90 | 4,448 |
| 17c | 6b | 3,578 | 81.47 | 18.53 | 30 | 87.55 | 12.45 | 5,318 |
| 18c | 6b | 3,578 | 81.47 | 18.53 | 45 | 89.30 | 10.70 | 6,188 |

The products obtained and described in preceding Table VIII not only represent one type of the ultimate glycols to be esterified but also represent the oxypropylated intermediate which when subjected to oxyethylation produces another type of ultimate glycol. Needless to say, the oxyethylation is identical with the oxyethylation where a polypropyleneglycol is subjected to oxyethylation. Four of such final oxyethylated products have been prepared and are included in Table IX, following. In each case the compounds are indicated by numbers with a small "d" thereafter, such as 1d, 2d, etc. In each instance the oxypropylated intermediate was 16c and was the product of reaction described in Table VIII.

TABLE IX

| Ex. No. | Oxypropylated intermediate | | Ignoring initial mole of water | | Moles of EtO added by second oxyethylation step | Final oxyethylated derivative | | |
|---|---|---|---|---|---|---|---|---|
| | | | | | | Ignoring initial mole of water | | Molecular weight including 1 mole H₂O |
| | Ex. No. | Molec. weight | Percent PrO | Percent EtO | | Percent PrO | Percent EtO | |
| 1d | 16c | 4,448 | 85.10 | 14.90 | 15 | 74.10 | 25.90 | 5,108 |
| 2d | 16c | 4,448 | 85.10 | 14.90 | 30 | 65.60 | 34.40 | 5,768 |
| 3d | 16c | 4,448 | 85.10 | 14.90 | 60 | 53.30 | 46.70 | 7,988 |
| 4d | 16c | 4,448 | 85.10 | 14.90 | 90 | 44.90 | 55.10 | 8,408 |

*Subdivision C*

In this subdivision the preparation of products having up to and including fifteen alternating hydrophobic and hydrophilic polyoxyalkylene chains is described. These more highly segmented products are prepared generally according to the procedures described in Subdivisions A and B of this Part 2 and represent ultimate glycols having either a hydrophobic nucleus or a hydrophilic nucleus. They also represent products in which a single hydrophobic segment consists of both oxypropylene and oxybutylene radicals.

The preparation of the more highly segmented products is illustrated by the following examples and tables.

*Example 1*

The reaction vessel employed was a stainless steel autoclave with the usual devices for heating, heat control, stirrer, inlet, outlet, etc., which are conventional in this type of apparatus. The stirrer operated at approximately 250 r.p.m. There were charged into the autoclave 30 pounds of polyethylene glycol —300. There was added .06 pound of sodium methylate. The autoclave was sealed and swept with nitrogen gas. Heat was applied with stirring so as to get an appropriate solution or suspension of catalyst. The temperature was allowed to rise to 130° C. At this point addition of a mixture of butylene oxide and proylene oxide, wherein the mole ratio was 1 mole of butylene oxide to 2 moles of propylene oxide, was begun. Addition of the butylene oxide-propylene oxide mixture was continuous until 37½ pounds of the mixture had been added. This represents the addition of approximately 2 moles of butylene oxide and 4 moles of propylene oxide per mole of initial reactant.

Example 2

The same general procedure was followed as in Example 1 except that the addition of the final butylene oxide-propylene oxide mixture was continued until the equivalent of 4 moles of butylene oxide and 8 moles of propylene oxide had been added.

Example 3

The same procedure was followed as in Examples 1 and 2 preceding, except that the addition of the butylene oxide-propylene oxide mixture was continued until the equivalent of 6 moles of butylene oxide and 12 moles of propylene oxide per mole of initial reactant had been added.

Example 1a

The same apparatus and general procedure were used as described in Example 1 except that as an initial reactant the product of Example 1 was used and ethylene oxide was added until the equivalent of 5 moles of ethylene oxide had been added per mole of intermediate reactant.

Example 2a

The same general procedure was followed as in Example 1 except that as an initial reactant the product of Example 2 was used and ethylene oxide was added until the equivalent of 5 moles of ethylene oxide had been added per mole of intermediate reactant.

Example 3a

The same general procedure was followed as in Example 1a except that as an initial reactant the product of Example 3 was used and ethylene oxide was added until the equivalent of 5 moles of ethylene oxide had been added per mole of intermediate reactant.

Example 1aa

The same apparatus and general procedure was used as described in Example 1 except that as an inital reactant the product of Example 1a was used and butylene oxide was added until the equivalent of 5 moles of butylene oxide had been added per mole of intermediate reactant.

Example 2aa

The same general procedure was followed as in Example 1 except that as an initial reactant the product of Example 2a was used and butylene oxide was added until the equivalent of 5 moles of butylene oxide had been added per mole of intermediate reactant.

Example 3aa

The same general procedure was followed as in Example 1 except that as an initial reactant the product of Example 3a was used and butylene oxide was added until the equivalent of 5 moles of butylene oxide had been added per mole of intermediate reactant.

The products of Examples 1, 1a, 2, 2a, 3 and 3a represent intermediate glycols and the products of Examples 1aa, 2aa, 3aa, 4, 4a, 5, 5a, 6 and 6a represent final glycols to be esterified.

The products obtained in the above examples are set forth in the following Table X in terms of the molar proporations, based on one mole of water, of the particular alkylene oxides added to the initial polyalkylene glycol reactant. Also Table X sets forth more highly segmented products obtained by further oxyalkylation of the products of Examples 1aa, 2aa, 3aa, with the indicated alkylene oxide in the order shown. These more highly segmented products were prepared by oxyalkylating the appropriate intermediate with the indicated proportion of the appropriate alkylene oxide generally according to the procedure of Example 1.

TABLE X
[Molal proportion based on one mole of water]

| Ex. No. | EtO in initial glycol | Added BuO-PrO [1] | Added EtO | Added BuO | Added EtO | Added PrO | Added EtO |
|---|---|---|---|---|---|---|---|
| 1 | 6.4 | 2.0 | | | | | |
| 1a | 6.4 | 2.0 | 5.0 | | | | |
| 1aa | 6.4 | 2.0 | 5.0 | 5.0 | | | |
| 1aaa | 6.4 | 2.0 | 5.0 | 5.0 | 5.0 | | |
| 1aaaa | 6.4 | 2.0 | 5.0 | 5.0 | 5.0 | 5.0 | |
| 1aaaaa | 6.4 | 2.0 | 5.0 | 5.0 | 5.0 | 5.0 | 5.0 |
| 2 | 6.4 | 4.0 | | | | | |
| 2a | 6.4 | 4.0 | 5.0 | | | | |
| 2aa | 6.4 | 4.0 | 5.0 | 5.0 | | | |
| 3aaa | 6.4 | 4.0 | 5.0 | 5.0 | 5.0 | | |
| 2aaaa | 6.4 | 4.0 | 5.0 | 5.0 | 5.0 | 5.0 | |
| 2aaaaa | 6.4 | 4.0 | 5.0 | 5.0 | 5.0 | 5.0 | 5.0 |
| 3 | 6.4 | 6.0 | | | | | |
| 3a | 6.4 | 6.0 | 5.0 | | | | |
| 3aa | 6.4 | 6.0 | 5.0 | 5.0 | | | |
| 3aaa | 6.4 | 6.0 | 5.0 | 5.0 | 5.1 | | |
| 3aaaa | 6.4 | 6.0 | 5.0 | 5.0 | 5.1 | 5.4 | |
| 3aaaaa | 6.4 | 6.0 | 5.0 | 5.0 | 5.1 | 5.4 | 4.92 |

[1] The M. W. of the mixture was taken as 188, i.e., 2 PrO: 1 BuO. Thus a 1-mole addition of the mixture would theoretically give 2 moles of PrO and 1 mole BuO addition.

Tables XI and XII present additional examples of more highly segmented products of my invention also in terms of the molar proportions, based on one mole of water, of the particular alkylene oxides added to the initial polyalkylene glycol reactant. The examples of Table XI illustrate products obtained by reacting a polypropylene glycol alternately with ethylene and propylene oxides. The examples of Table XII illustrate products obtained by reacting a polyethylene glycol alternately with propylene and ethylene oxides. The products of these examples were similarly prepared by oxyalkylating the initial glycol or the appropriate intermediate with the indicated proportion of the appropriate alkylene oxide generally according to the procedure described in Example 1.

TABLE XI
[Molal proportion based on one mole of water]

| Ex. No. | PrO in initial glycol | Added EtO | Added PrO | Added EtO | Added PrO | Added EtO |
|---|---|---|---|---|---|---|
| 4 | 10.7 | 6.04 | 82.1 | | | |
| 5 | 10.7 | 6.04 | 108 | | | |
| 6 | 10.7 | 6.04 | 147 | | | |
| 7 | 10.7 | 6.04 | 61.7 | 11.3 | | |
| 8 | 10.7 | 6.04 | 61.7 | 43.6 | | |
| 9 | 10.7 | 6.04 | 82.1 | 14.2 | | |
| 10 | 10.7 | 6.04 | 82.1 | 32.0 | | |
| 11 | 10.7 | 6.04 | 82.1 | 54.9 | | |
| 12 | 10.7 | 12.3 | 71.4 | | | |
| 13 | 10.7 | 12.3 | 94.8 | | | |
| 14 | 10.7 | 12.3 | 71.4 | 33.6 | | |
| 15 | 10.7 | 12.3 | 71.4 | 13.4 | | |
| 16 | 10.7 | 12.3 | 71.4 | 51.7 | | |
| 17 | 10.7 | 12.3 | 71.4 | 80.3 | | |
| 18 | 10.7 | 12.3 | 94.8 | 16.8 | | |
| 19 | 10.7 | 12.3 | 94.8 | 37.8 | | |
| 20 | 10.7 | 12.3 | 94.8 | 64.9 | | |
| 21 | 10.7 | 12.3 | 94.8 | 101 | | |
| 22 | 10.7 | 12.3 | 138 | 23.2 | | |
| 23 | 10.7 | 12.3 | 138 | 52.2 | | |
| 24 | 10.7 | 12.3 | 138 | 89.4 | | |
| 25 | 12.4 | 30.5 | 110 | 10.8 | | |
| 26 | 12.4 | 30.5 | 110 | 4.21 | | |
| 27 | 12.4 | 30.5 | 110 | 22.9 | | |
| 28 | 12.4 | 30.5 | 110 | 51.5 | | |
| 29 | 12.4 | 30.5 | 133 | 11.7 | | |
| 30 | 12.4 | 30.5 | 133 | 4.55 | | |
| 31 | 12.4 | 30.5 | 110 | 15.5 | | |
| 32 | 12.4 | 30.5 | 133 | 24.6 | | |
| 33 | 12.4 | 30.5 | 133 | 16.8 | | |
| 34 | 12.4 | 30.5 | 133 | 39.3 | | |
| 35 | 12.4 | 30.5 | 133 | 74.0 | | |
| 36 | 12.4 | 30.5 | 133 | 55.7 | | |
| 37 | 36.7 | 30.5 | 22.8 | | | |
| 38 | 36.7 | 30.5 | 22.8 | 6.22 | | |
| 39 | 36.7 | 30.5 | 22.8 | 15.7 | | |
| 40 | 36.7 | 30.5 | 22.8 | 21.4 | | |
| 41 | 36.7 | 30.5 | 22.8 | 35.7 | | |

TABLE XI—Continued
[Molal proportion based on one mole of water]

| Ex. No. | PrO in initial glycol | Added EtO | Added PrO | Added EtO | Added PrO | Added EtO |
|---|---|---|---|---|---|---|
| 42 | 36.7 | 30.5 | 22.8 | 23.0 | | |
| 43 | 36.7 | 30.5 | 22.8 | 34.9 | | |
| 44 | 36.7 | 30.5 | 22.8 | 47.1 | | |
| 45 | 36.7 | 30.5 | 22.8 | 57.8 | | |
| 46 | 36.7 | 21.5 | 2.80 | | | |
| 47 | 36.7 | 21.5 | 5.90 | | | |
| 48 | 36.7 | 21.5 | 9.35 | | | |
| 49 | 36.7 | 21.5 | 13.3 | | | |
| 50 | 36.7 | 21.5 | 17.7 | | | |
| 51 | 36.7 | 30.5 | 3.16 | | | |
| 52 | 36.7 | 30.5 | 6.64 | | | |
| 53 | 36.7 | 30.5 | 10.6 | | | |
| 54 | 36.7 | 30.5 | 15.0 | | | |
| 55 | 36.7 | 30.5 | 20.0 | | | |
| 56 | 36.7 | 30.5 | 22.8 | 6.22 | 4.60 | |
| 57 | 36.7 | 30.5 | 22.8 | 6.22 | 9.75 | |
| 58 | 36.7 | 30.5 | 22.8 | 6.22 | 17.3 | |
| 59 | 36.7 | 30.5 | 22.8 | 6.22 | 21.9 | |
| 60 | 36.7 | 30.5 | 22.8 | 6.22 | 29.2 | |
| 61 | 36.7 | 30.5 | 22.8 | 15.7 | 6.35 | |
| 62 | 36.7 | 30.5 | 22.8 | 15.7 | 10.5 | |
| 63 | 36.7 | 30.5 | 22.8 | 15.7 | 16.7 | |
| 64 | 36.7 | 30.5 | 22.8 | 15.7 | 23.7 | |
| 65 | 36.7 | 30.5 | 22.8 | 15.7 | 31.6 | |
| 66 | 36.7 | 30.5 | 22.8 | 21.4 | 5.21 | |
| 67 | 36.7 | 30.5 | 22.8 | 21.4 | 11.0 | |
| 68 | 36.7 | 30.5 | 22.8 | 21.4 | 19.5 | |
| 69 | 36.7 | 30.5 | 22.8 | 21.4 | 24.7 | |
| 70 | 36.7 | 30.5 | 22.8 | 21.4 | 33.0 | |
| 71 | 37.2 | 89.6 | 81.3 | | | |
| 72 | 37.2 | 89.6 | 104 | | | |
| 73 | 37.2 | 89.6 | 127 | | | |
| 74 | 12.4 | 60.9 | 29.3 | | | |
| 75 | 12.4 | 60.9 | 71.2 | | | |
| 76 | 12.4 | 60.9 | 119 | | | |
| 77 | 12.4 | 60.9 | 150 | | | |
| 78 | 12.4 | 30.5 | 60.4 | | | |
| 79 | 12.4 | 60.9 | 180 | | | |
| 80 | 12.4 | 30.5 | 34.2 | | | |
| 81 | 12.4 | 30.5 | 83.0 | | | |
| 82 | 12.4 | 30.5 | 110 | | | |
| 83 | 12.4 | 30.5 | 133 | | | |
| 84 | 12.4 | 30.5 | 157 | | | |
| 85 | 12.4 | 30.5 | 186 | | | |
| 86 | 12.4 | 60.9 | 71.2 | 9.1 | | |
| 87 | 12.4 | 60.9 | 71.2 | 3.5 | | |
| 88 | 12.4 | 60.9 | 71.2 | 19.0 | | |
| 89 | 12.4 | 60.9 | 71.2 | 13.0 | | |
| 90 | 12.4 | 60.9 | 71.2 | 47.2 | | |
| 91 | 12.4 | 60.9 | 71.2 | 30.5 | | |
| 92 | 12.4 | 60.9 | 119 | 4.81 | | |
| 93 | 12.4 | 60.9 | 119 | 12.5 | | |
| 94 | 12.4 | 60.9 | 119 | 12.95 | | |
| 95 | 12.4 | 60.9 | 119 | 26.2 | | |
| 96 | 36.7 | 30.5 | 22.8 | 35.6 | 69.3 | |
| 97 | 36.7 | 30.5 | 22.8 | 35.6 | 92.6 | |
| 98 | 36.7 | 30.5 | 22.8 | 35.6 | 119 | |
| 99 | 36.7 | 30.5 | 22.8 | 35.6 | 119 | 14.8 |
| 100 | 36.7 | 30.5 | 22.8 | 35.6 | 119 | 30.4 |
| 101 | 36.7 | 30.5 | 22.8 | 35.6 | 119 | 47.0 |
| 102 | 36.7 | 30.5 | 22.8 | 35.6 | 119 | 62.7 |
| 103 | 36.7 | 30.5 | 22.8 | 35.6 | 119 | 76.5 |
| 104 | 36.7 | 30.5 | 22.9 | 35.7 | | |
| 105 | 36.7 | 30.5 | 22.9 | 35.7 | 22.9 | |
| 106 | 36.7 | 30.5 | 22.9 | 35.7 | 34.9 | |
| 107 | 36.7 | 30.5 | 22.9 | 35.7 | 47.0 | |
| 108 | 36.7 | 30.5 | 22.9 | 35.7 | 57.6 | |

TABLE XII
[Molal Proportion Based on One Mole of Water]

| Ex. No. | EtO in initial glycol | Added PrO | Added EtO | Added PrO | Added EtO | Added PrO | Added EtO | Added PrO |
|---|---|---|---|---|---|---|---|---|
| 109 | 16.6 | 38.8 | 34.3 | 26.0 | | | | |
| 110 | 16.6 | 38.8 | 34.3 | 26.0 | 6.8 | | | |
| 111 | 16.6 | 38.8 | 34.3 | 26.0 | 19.0 | | | |
| 112 | 16.6 | 38.8 | 34.3 | 26.0 | 27.5 | | | |
| 113 | 16.6 | 38.8 | 34.3 | 26.0 | 30.2 | | | |
| 114 | 16.6 | 38.8 | 34.3 | 26.0 | 34.0 | | | |
| 115 | 16.6 | 38.8 | 34.3 | 26.0 | 34.0 | 26.1 | | |
| 116 | 16.6 | 38.8 | 34.3 | 26.0 | 34.0 | 38.8 | | |
| 117 | 16.6 | 38.8 | 34.3 | 26.0 | 34.0 | 51.7 | | |
| 118 | 16.6 | 38.8 | 34.3 | 26.0 | 34.0 | 64.7 | | |
| 119 | 16.6 | 38.8 | 34.3 | 26.0 | 34.0 | 77.6 | | |
| 120 | 16.6 | 38.8 | 34.3 | 26.0 | 34.0 | 104.0 | | |
| 121 | 16.6 | 38.8 | 34.3 | 26.0 | 34.0 | 129.5 | | |
| 122 | 16.6 | 38.8 | 34.3 | 26.0 | 34.0 | 129.5 | 16.8 | |
| 123 | 16.6 | 38.8 | 34.3 | 26.0 | 34.0 | 129.5 | 34.1 | |
| 124 | 16.6 | 38.8 | 34.3 | 26.0 | 34.0 | 129.5 | 67.4 | |
| 125 | 16.6 | 38.8 | 34.3 | 26.0 | 34.0 | 129.5 | 103.6 | |
| 126 | 16.6 | 38.8 | 34.3 | 26.0 | 34.0 | 129.5 | 109.5 | |
| 127 | 16.6 | 38.8 | 34.3 | 26.0 | 34.0 | 129.5 | 109.5 | 25.1 |
| 128 | 16.6 | 38.8 | 34.3 | 26.0 | 34.0 | 129.5 | 109.5 | 39.0 |
| 129 | 16.6 | 38.8 | 34.3 | 26.0 | 34.0 | 129.5 | 109.5 | 53.1 |

PART 3

The polycarboxy acids used may have two or more carboxyl groups. When using a dicarboxy acid or anhydride that has only two carboxyl groups or the equivalent, one usually does not have difficulty from the standpoint of cross-linking or gelation. Therefore, the preference is to employ dicarboxy acids. Actually, as previously noted, due to the long chain length between the hydroxyl groups there is comparatively little danger of cross-linking or gelation to the stage where an insoluble product is obtained even when tricarboxy and tetracarboxy acid are employed. The dicarboxy acids may be comparatively low molal acids or high molal acids.

Dicarboxy acids may have as many as 32 carbon atoms and even more, particularly when derived by the oxidation of wax or by other procedures as subsequently noted. Common well known dicarboxy acids having 8 carbon atoms or more (excluding carboxyl group carbon atoms) are sebacic acid, methylene disalicylic acid, etc. Comparable disalicylic acids have been obtained by introducing an alkyl substituent having not over 10 carbon atoms into both phenolic nuclei.

Other well known types of dibasic acids are those derived from maleic anhydride and are known as adduct acids. Examples are the products obtained by reaction between maleic anhydride and terpenes to yield well known adduct acids having the hydrophobe characterization above described. Monocarboxy acids, such as sorbic acid, can be reacted in a comparable manner with an unsaturated fatty acid such as linolenic acid to give a suitable reactant. Other types can be obtained from compounds comparable to Clocker adducts involving addition next to an unsaturated bond but not involving the bond as such, as for example, where oleic acid is used as one of the initial reactants. Sometimes the production of the adduct acid yields as an initial stage the anhydride. Obviously the anhydride can be reacted with water to give the parent acid.

A variety of dimerized fatty acids have been obtained and are described in the patent literature. See, for example, U.S. Patent No. 2,417,739, dated March 18, 1947, to De Groote, and more particularly to U.S. Patent No. 2,632,695, dated March 24, 1953, to Landis et al.

An analogous variety of dicarboxy acids are obtained from abietic acid or the like and generally referred to as dimerized rosin acids. Dimerized acids have been obtained from fish oil fatty acids in which the total number of carbon atoms may have varied from 20 to 24 and thus the dimerized acids may have as many as 44, or even more, carbon atoms. The same applies to certain dimerized acids obtained from the oxidation of wax. Furthermore, esters of dimerized acids have been reacted with aromatic materials such as alkylated or polyalkylated naphthalene in the presence of aluminum chloride, or the like, to yield dicarboxy acids having as many as 50 carbon atoms.

Referring to a consideration of dimeric fatty acids one may illustrate this structure by the following composition:

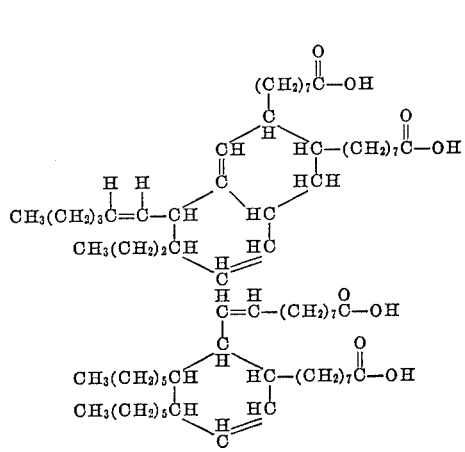

The acids produced commercially run approximately 85% or better dimer content with some trimer and some monomer. As pointed out in aforementioned U.S. Patent No. 2,632,695, a well-known source of these dimeric acids is the product sold by Emery Industries, Inc., and said to be dilinoleic acid. In the literature published by the Emery Industries, Inc., the properties of this product are given as follows:

Neutral equivalent _____ 290–310.
Iodine value _____ 80–95.
Color _____ Gardner 12 (max.).
Dimer content _____ Approx. 85%.
Trimer and higher _____ Approx. 12%.
Monomer _____ Approx. 3%.

It is known that mono-olefinic hydrocarbons react by what is termed the 1,2-addition reaction, with compounds containing an ethylenic group linked directly and in conjugated relation to a carbonyl group such as maleic acid anhydride to give unsaturated compounds. The reaction is shown by Eichwald in U.S. Patent 2,055,456, as well as by Moser in U.S. Patents 2,124,628; 2,133,734; and 2,230,005. The reaction is also disclosed in an application of Van Melsen, Serial No. 263,056, filed March 20, 1939. In each case, the condensation or addition products obtained by the 1,2-addition reaction are unsaturated compounds. This disclosed reaction may be illustrated, for example, by that which occurs in the reaction of octadecylene with maleic anhydride. The reaction may be represented as follows:

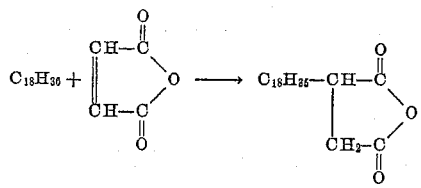

It is seen that the product is unsaturated, being an alkenyl succinic acid anhydride.

Alkenyl succinic acids are produced by various procedures and particularly by condensing maleic acid anhydride with $C_{12}$ and higher mono-olefines, hydrolyzing the reaction product and hydrogenating the hydrolyzed material to remove olefinic double bonds.

Similarly, another class of analogous compounds are substituted malonic acids such as cetyl malonic acid, stearyl malonic acid, oleyl malonic acid, octyl cetyl malonic acid, etc.

Other suitable dicarboxy acids are illustrated by

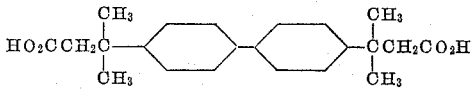

See U.S. Patent No. 2,497,673, dated February 14, 1950, to Kirk. See also U.S. Patent No. 2,369,640, dated February 20, 1945, to Barnum. This particular patent illustrates a dicarboxy acid of the ether type, such as the following:

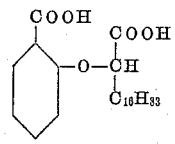

Another variety is illustrated in U.S. Patent No. 2,459,717, dated January 18, 1949, to Perry. An example of this particular variety is the following:

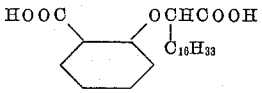

Note also the variety of polycarboxy acids, many of which are dicarboxy acids, described in U.S. Patent No. 2,349,044, dated May 16, 1944, to Jahn.

Also note U.S. Patent No. 2,182,178 describes isodocylene succinic acid anhydride, isononylene succinic acid anhydride, isotetradecylene succinic anhydride, etc.

As to a description of a number of other suitable dicarboxy acids derived from various raw materials reference is made to the following patents: U.S. Patent Nos. 1,702,002; 1,721,560; 1,944,731; 1,993,025; 2,230,005; 2,232,435; 2,368,602; 2,402,825; 2,490,744; 2,514,533; and 2,518,495.

Note that U.S. Patent No. 2,360,426 describes the production of a higher alkene-substituted dicarboxylic acid of the general formula

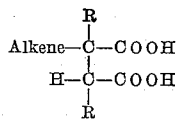

in which R is selected from the group consisting of hydrogen and alkyl radicals, and alkene is an alkene group having not less than 5 and not more than 16 carbon atoms, which comprises heating an alkyl halide containing not less than 5 and not more than 16 carbon atoms with an unsaturated aliphatic dicarboxylic acid of the general formula:

in which R is selected from the group consisting of hydrogen and alkyl radicals, at a temperature at which hydrogen halide is split out.

It particularly describes in detail the preparation of decene-succinic acid, undecene-succinic acid, and dodecene-succinic acid, all of which are particularly desirable for the present purpose.

The above specifically described dicarboxy acids are characterized by the presence of at least one hydrocarbon group containing at least 8 carbon atoms and are relatively high molal acids. However, one can also produce excellent compounds by the use of low molal dicarboxy acids alone or in combination with high molal dicarboxy acids. Examples of such low molal dicarboxy acids are succinic acid, glutaric acid, adipic acid, pamelic acid, suberic acid, and azelaic acid. Similarly, one may use cyclic acids such as phthalic acid, isophthalic acid, and terephthalic acid. One can also use tetrahydrophthalic anhydride and hexahydrophthalic anhydride.

As is well known one can obtain low molal glycols such as ethyleneglycol, diethyleneglycol, triethyleneglycol, propyleneglycol, dipropyleneglycol, tripropyleneglycol, butyleneglycol, etc. Such products can be converted into dicarboxy acids by either one of two well known procedures. Reaction with acrylonitrile or with chloroacetic acid can be used. In the use of acrylonitrile the terminal hydroxyl hydrogen atom is replaced by the radical

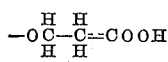

In the use of chloroacetic acid the terminal hydrogen atom is replaced by

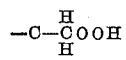

I have found that for many purposes including demulsification the most effective compounds are obtained from reactants characterized by freedom from any radical having 8 carbon atoms or more. For this reason, it is our preference to use low molal dicarboxy acids and particularly glycolic acid, ethylene bis (glycolic acid) of the formula $HOOCCH_2OCH_2CH_2OCH_2COOH$, oxalic acid, provided decomposition is avoided, and other low molal acids such as succinic acid or maleic acid. Previous reference has been made to the use of the acids.

Needless to say, any one of a number of functional equivalents such as the anhydride, an ester, an amide, or the like, may be used to replace the acid. Indeed, many of the acids are more readily available in the anhydride form than the acid form.

What has been said in regard to the dicarboxy acids applies of course to the polycarboxy acids although the number available at comparatively low prices is somewhat limited. Here, again, however, the variety used may be large and thus particularly of interest are low molal acids such as tricarballylic acid, aconitic acid, and tetracarboxybutane. Other acids are obtainable such as Diels-Alder adducts, Clocker adducts, and the like. They include, among others, examples of tetracarboxy acids described in U.S. Patent No. 2,329,432, dated September 14, 1943, to Bruson. As examples of the ketonic tetracarboxylic acids they are described as follows:

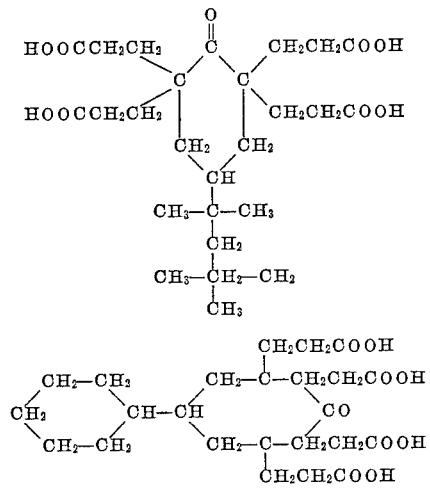

Various aryl tetracarboxylic acid anhydrides which can be readily converted into the corresponding acids are described in U.S. Patent 2,625,555, dated January 13, 1953, to Miller.

Suitable tetracarboxy derivatives are described in U.S. Patent No. 2,450,627, dated October 5, 1948, to Bloch. Such acids are obtained by a process which comprises heating at a temperature of from about 100° C. to about 350° C. in the presence of an aqueous alkaline reagent the adduct of a dienophilic dibasic acidic compound and a cyclic polyolefinic hydrocarbon containing isolated unsaturation and at least some conjugated unsaturation, and acidifying the polymer product formed in the said heating step to form said tetrabasic acid.

Comparable to the ketonic carboxylic acids above described are the ketonic tricarboxylic acids. See U.S. Patent No. 2,320,217, dated May 25, 1943, to Bruson. Examples are as follows:

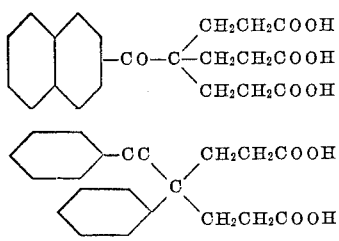

Substituted pimelic acids having 3 carboxyl radicals are described in U.S. Patent No. 2,339,218, dated January 11, 1944, to Bruson. An example is the following

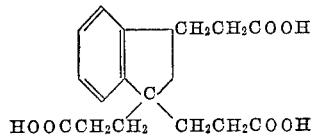

A variety of tricarboxylic acids which are of particular interest is obtained by reaction between maleic anhydride and a suitable unsaturated acid, such as linolenic acid. There are two types, depending on the nature of the unsaturation of the fatty acid employed. One well known type is the type commonly referred to as Clocker adducts and described in considerable detail in U.S. Patents Nos. 2,188,883; 2,188,884; 2,188,885; 2,188,886; 2,188,887; 2,188,888; 2,188,889; and 2,188,890, all dated January 30, 1940, to Clocker. An example of such well known reaction is the following:

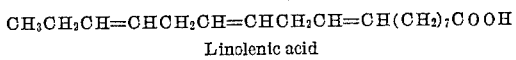

Linolenic acid

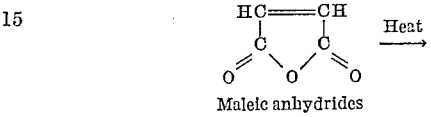

Maleic anhydrides

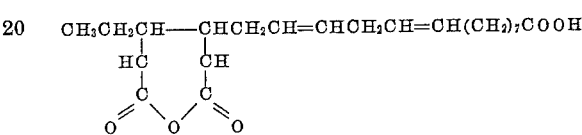

Maleic condensation product of linolenic acid

As to similar products more akin to Diels-Alder derivatives see U.S. Patent No. 2,124,628, dated July 26, 1938, to Moser.

See, also, U.S. Patent No. 2,264,354, dated December 2, 1941, to Alder et al.

Another tricarboxylic acid is described in U.S. Patent No. 2,517,563, dated August 8, 1950, to Harris.

Other suitable examples are described in U.S. Patents Nos. 2,390,024, dated November 27, 1945, to Bruson; 2,359,980, dated October 10, 1944, to Fleck; and 2,039,243, dated April 28, 1936, to Krzikalla et al.

PART 4

Part 4 is concerned with the esters, either monomeric or polymeric, obtained from the glycols prepared in the manner described in Part 2, and the polycarboxy acids described in Part 3. One may use any obvious equivalent instead of a polycarboxy acid such as the anhydride, the acyl chloride, or an ester. One may follow a procedure so the one product is largely a monomer; for instance, if one uses the ratio of two parts of polycarboxy acid to one part of glycol the reaction yields a fractional ester having free carboxyl radicals. Inversely, if one uses two moles of the glycol and one mole of a dicarboxy acid one obtains principally a monomer which is a fractional ester having free hydroxyl radicals. If, on the other hand, one selects a one-to-one ratio of a dicarboxy acid and a glycol the tendency is to produce linear polymers, particularly if an effort is made to conduct the reaction as far as it will go without decomposition. A variety of intermediates can be obtained which vary in molecular weight. All of this is simple conventional procedure and information concerning such procedure has appeared repeatedly in numerous patents. See, for example, the description in U.S. Patent No. 2,562,878, dated August 7, 1951, to Blair. In the instant procedure one can follow the same method outlined in the text beginning in column 4, line 62.

Similarly, U.S. Patent No. 2,679,516, dated May 25, 1954, to De Groote describes a procedure for making fractional esters but the obvious variation in molal ratio of glycol to reactant corresponding, for example, to the ratios in the aforementioned Blair patent, produce polymers. Particular attention is directed to Part 3 of said patent. Note that a procedure is included for removing the slight amount of alkali which may remain from the oxyalkylation procedure. In the examples which are summarized in Tables XIII and XIV the excess of alkali was eliminated entirely, or for all practical purposes, by using the procedure outlined in the aforementioned De Groote patent in column 19, beginning at line 11. In other examples particularly where the final alkali content was low no effort was made to remove the alkali but enough of the carboxy acid was added in excess over the amount employed for esterification purposes to neutralize the alkali. This is particularly satisfactory when low molal polycarboxy acids are used and especially dicarboxy acid.

In practically all cases the esterification took place readily by using the temperatures as indicated in Table XIII and the reaction times as indicated in the same table. The particular equipment employed was a resin pot as described in aforementioned De Groote Patent 2,679,516, in the second paragraph of Part 3. If the reaction does not proceed rapidly then sometimes a small amount of sulfonic acid, either an alkane sulfonic acid or an aromatic sulfonic acid, is employed. The amount used varies from a few tenths percent up to one percent or even more. Such use is dependent in part on whether or not the residual catalyst would be objectionable. When the carboxy acid reactants are fairly strong acids they, of course, serve as their own catalyst. In other instances the reaction has been speeded up by passing just a slow stream of dry hydrochloric acid gas through the mixture. Any suitable and conventional method of esterification commonly employed in producing esters, both monomeric or linear, from polycarboxy acids and glycols can be employed.

The esters may be water soluble but in most instances they will be organic solvent soluble or at least soluble in a mixture of the kind described in the text which appears as the first part of Part 5. The esters as produced will vary in color from almost water-white or pale straw, to a darker color depending in part on the polycarboxy acid used. For instance, dimeric fatty acids tend to give darker colored esters than some other acids. The esters can be bleached by any conventional method, such as those for bleaching glycols, i.e., filtering clays, chars, and even organic bleaches such as peroxides or the like. For most applications there is no need to bleach the products and there is no need to remove the small amounts of salts if present due to neutralization of a catalyst. After mixing with a suitable solvent the solution may be allowed to stand in a quiescent state until any insolubles separate by settling.

*Example 4a*

The polyalkylene glycol employed was that of Example 4. The theoretical molecular weight of the glycol was 5660. The acid used for esterification was diglycolic acid. The ratio employed was 1.9:1. The amount of glycol used was 200 grams. The amount of diglycolic acid employed was 9 grams. This was mixed with 100 grams of a mixed aromatic solvent. Esterification was conducted by means of a glass resin pot using the conventional stirrer, inlet, outlet, and phase-separating trap. The maximum temperature during the esterification was 204° C. The time of esterification was 8 hours. The amount of water out was 0.5 cc. In the final solution the solvent represented approximately 32.4% of the mixture. Such solvent can be removed readily by distillation, particularly vacuum distillation, if desired. In some instances it is desirable to use a variant of this procedure employing both benzene, as a dehydrating agent and also as the solvent during the reflux period, in combination with a high boiling aromatic petroleum solvent. This procedure is described in detail in columns one and two of U.S. Patent No. 2,679,510, dated May 25, 1954, to De Groote.

Example 4a, with other examples, appears in tabular form in Tables XI and XII, following.

TABLE XIII

| Ex. No. of ester | Ex. No. of glycol | Mol. weight of glycol | Acid or anhydride used | Mol. weight of acid | Molal ratio, acid to glycol | Glycol used, gms. | Polycarboxy reactant, gms. |
|---|---|---|---|---|---|---|---|
| 4a | 4 | 5,660 | Diglycolic | 134 | 1.90 | 200 | 9 |
| 5a | 5 | 7,180 | do | 134 | 2.41 | 200 | 9 |
| 6a | 6 | 9,440 | do | 134 | 3.17 | 200 | 9 |
| 7a | 7 | 4,975 | do | 134 | 1.67 | 200 | 9 |
| 8a | 8 | 6,400 | do | 134 | 2.15 | 200 | 9 |
| 9a | 8 | 6,400 | Dodecenyl succinic | 266 | 1.08 | 200 | 9 |
| 10a | 8 | 6,400 | Dimeric fatty acid | 600 | 0.48 | 200 | 9 |
| 11a | 9 | 6,280 | Diglycolic | 134 | 2.11 | 200 | 9 |
| 12a | 10 | 7,030 | do | 134 | 2.36 | 200 | 9 |
| 13a | 11 | 8,040 | do | 134 | 2.70 | 200 | 9 |
| 14a | 12 | 5,305 | do | 134 | 1.78 | 200 | 9 |
| 15a | 13 | 6,675 | do | 134 | 2.24 | 200 | 9 |
| 16a | 13 | 6,675 | Maleic | 98 | 3.06 | 200 | 9 |
| 17a | 13 | 6,675 | Azelaic | 188 | 1.60 | 200 | 9 |
| 18a | 14 | 6,760 | Diglycolic | 134 | 2.27 | 150 | 6.75 |
| 19a | 15 | 5,870 | do | 134 | 1.97 | 150 | 6.75 |
| 20a | 16 | 7,560 | do | 134 | 2.54 | 150 | 6.75 |
| 21a | 17 | 8,820 | do | 134 | 2.96 | 150 | 6.75 |
| 22a | 18 | 7,390 | do | 134 | 2.48 | 150 | 6.75 |
| 23a | 18 | 7,390 | Hexahydrophthalic | 154 | 2.16 | 150 | 6.75 |
| 24a | 18 | 7,390 | Phthalic | 148 | 2.24 | 150 | 6.75 |
| 25a | 19 | 8,310 | Diglycolic | 134 | 2.79 | 150 | 6.75 |
| 26a | 20 | 9,500 | do | 134 | 3.19 | 150 | 6.75 |
| 27a | 21 | 11,100 | do | 134 | 3.73 | 150 | 6.75 |
| 28a | 22 | 10,180 | do | 134 | 3.42 | 150 | 6.75 |
| 29a | 23 | 11,460 | do | 134 | 3.85 | 150 | 6.75 |
| 30a | 23 | 11,460 | Maleic | 98 | 5.26 | 150 | 6.75 |
| 31a | 23 | 11,460 | Azelaic | 188 | 2.74 | 150 | 6.75 |
| 32a | 24 | 13,100 | Diglycolic | 134 | 4.40 | 150 | 6.75 |
| 33a | 25 | 9,570 | do | 134 | 3.21 | 175 | 7.88 |
| 34a | 26 | 9,270 | do | 134 | 3.11 | 175 | 7.88 |
| 35a | 27 | 10,100 | do | 134 | 3.39 | 175 | 7.88 |
| 36a | 28 | 11,350 | do | 134 | 3.81 | 175 | 7.88 |
| 37a | 28 | 11,350 | Hexahydrophthalic | 154 | 3.32 | 175 | 7.88 |
| 38a | 28 | 11,350 | Dodecenyl succinic | 266 | 1.92 | 175 | 7.88 |
| 39a | 29 | 10,300 | Diglycolic | 134 | 3.46 | 175 | 7.88 |
| 40a | 30 | 10,000 | do | 134 | 3.36 | 175 | 7.88 |
| 41a | 31 | 9,740 | do | 134 | 3.27 | 175 | 7.88 |
| 42a | 32 | 10,900 | do | 134 | 3.66 | 175 | 7.88 |
| 43a | 33 | 10,540 | do | 134 | 3.54 | 175 | 7.88 |
| 44a | 33 | 10,540 | Aconitic | 174 | 2.72 | 175 | 7.88 |
| 45a | 33 | 10,540 | Dimeric fatty acid | 600 | 0.79 | 175 | 7.88 |
| 46a | 34 | 11,520 | Diglycolic | 134 | 3.87 | 175 | 7.88 |
| 47a | 35 | 12,900 | do | 134 | 4.33 | 150 | 6.75 |
| 48a | 36 | 12,240 | do | 134 | 4.11 | 175 | 7.88 |
| 49a | 37 | 4,790 | do | 134 | 1.61 | 250 | 11.25 |
| 50a | 38 | 5,065 | do | 134 | 1.70 | 250 | 11.25 |
| 51a | 38 | 5,065 | Phthalic | 148 | 1.54 | 250 | 11.25 |
| 52a | 38 | 5,065 | Maleic | 98 | 2.32 | 250 | 11.25 |

TABLE XIII—Continued

| Ex. No. of ester | Ex. No. of glycol | Mol. weight of glycol | Acid or anhydride used | Mol. weight of acid | Molal ratio, acid to glycol | Glycol used, gms. | Polycarboxy reactant, gms. |
|---|---|---|---|---|---|---|---|
| 53a | 39 | 5,510 | Diglycolic | 134 | 1.85 | 250 | 11.25 |
| 54a | 40 | 5,750 | ___do___ | 134 | 1.93 | 250 | 11.25 |
| 55a | 41 | 6,380 | ___do___ | 134 | 2.14 | 250 | 11.25 |
| 56a | 42 | 7,720 | ___do___ | 134 | 2.59 | 250 | 11.25 |
| 57a | 43 | 8,400 | ___do___ | 134 | 2.82 | 250 | 11.25 |
| 58a | 43 | 8,400 | Tricarballylic | 176 | 2.15 | 250 | 11.25 |
| 59a | 43 | 8,400 | Aconitic | 174 | 2.17 | 250 | 11.25 |
| 60a | 44 | 9,120 | Diglycolic | 134 | 3.06 | 250 | 11.25 |
| 61a | 45 | 9,710 | ___do___ | 134 | 3.26 | 250 | 11.25 |
| 62a | 46 | 3,250 | ___do___ | 134 | 1.09 | 150 | 6.75 |
| 63a | 47 | 3,425 | ___do___ | 134 | 1.15 | 150 | 6.75 |
| 64a | 48 | 3,635 | ___do___ | 134 | 1.22 | 150 | 6.75 |
| 65a | 48 | 3,635 | Tetracarboxybutane | 234 | 0.70 | 150 | 6.75 |
| 66a | 48 | 3,635 | Azelaic | 188 | 0.87 | 150 | 6.75 |
| 67a | 49 | 3,875 | Diglycolic | 134 | 1.30 | 150 | 6.75 |
| 68a | 50 | 4,115 | ___do___ | 134 | 1.38 | 250 | 11.25 |
| 69a | 51 | 3,665 | ___do___ | 134 | 1.23 | 150 | 6.75 |
| 70a | 52 | 3,875 | ___do___ | 134 | 1.30 | 150 | 6.75 |
| 71a | 53 | 4,115 | ___do___ | 134 | 1.38 | 150 | 6.75 |
| 72a | 53 | 4,115 | Trilinoleic | 835 | 0.22 | 150 | 6.75 |
| 73a | 53 | 4,115 | Phthalic | 148 | 1.25 | 150 | 6.75 |
| 74a | 54 | 4,350 | Diglycolic | 134 | 1.46 | 150 | 6.75 |
| 75a | 55 | 4,650 | ___do___ | 134 | 1.56 | 250 | 11.25 |
| 76a | 56 | 5,360 | ___do___ | 134 | 1.80 | 150 | 6.75 |
| 77a | 57 | 5,630 | ___do___ | 134 | 1.89 | 150 | 6.75 |
| 78a | 58 | 6,080 | ___do___ | 134 | 2.04 | 150 | 6.75 |
| 79a | 58 | 6,080 | Tricarballylic | 176 | 1.55 | 150 | 6.75 |
| 80a | 58 | 6,080 | Tetracarboxybutane | 234 | 1.17 | 150 | 6.75 |
| 81a | 59 | 6,350 | Diglycolic | 134 | 2.13 | 150 | 6.75 |
| 82a | 60 | 6,760 | ___do___ | 134 | 2.27 | 250 | 11.25 |
| 83a | 61 | 5,870 | ___do___ | 134 | 1.97 | 150 | 6.75 |
| 84a | 62 | 6,110 | ___do___ | 134 | 2.05 | 150 | 6.75 |
| 85a | 63 | 6,460 | ___do___ | 134 | 2.17 | 150 | 6.75 |
| 86a | 63 | 6,460 | Trilinoleic | 835 | 0.35 | 150 | 6.75 |
| 87a | 63 | 6,460 | Dodecenyl succinic | 266 | 1.09 | 150 | 6.75 |
| 88a | 64 | 6,880 | Diglycolic | 134 | 2.31 | 150 | 6.75 |
| 89a | 65 | 7,330 | ___do___ | 134 | 2.46 | 250 | 11.25 |
| 90a | 66 | 6,050 | ___do___ | 134 | 2.03 | 150 | 6.75 |
| 91a | 67 | 6,380 | ___do___ | 134 | 2.14 | 150 | 6.75 |
| 92a | 68 | 6,880 | ___do___ | 134 | 2.31 | 150 | 6.75 |
| 93a | 68 | 6,880 | Hexahydrophthalic | 154 | 2.01 | 150 | 6.75 |
| 94a | 68 | 6,880 | Phthalic | 148 | 2.09 | 150 | 6.75 |
| 95a | 69 | 7,180 | Diglycolic | 134 | 2.41 | 150 | 6.75 |
| 96a | 70 | 7,660 | ___do___ | 134 | 2.57 | 150 | 6.75 |
| 97a | 71 | 10,850 | ___do___ | 134 | 4.05 | 200 | 10 |
| 98a | 71 | 10,850 | Maleic | 98 | 5.54 | 200 | 10 |
| 99a | 71 | 10,850 | Phthalic | 148 | 3.67 | 200 | 10 |
| 100a | 72 | 12,150 | Diglycolic | 134 | 4.53 | 300 | 15 |
| 101a | 72 | 12,150 | Maleic | 98 | 6.20 | 300 | 15 |
| 102a | 72 | 12,150 | Phthalic | 148 | 4.10 | 300 | 15 |
| 103a | 73 | 13,470 | Diglycolic | 134 | 5.02 | 300 | 15 |
| 104a | 73 | 13,470 | Maleic | 98 | 6.87 | 300 | 15 |
| 105a | 73 | 13,470 | Phthalic | 148 | 4.55 | 300 | 15 |
| 106a | 74 | 5,100 | Diglycolic | 134 | 1.71 | 200 | 9 |
| 107a | 75 | 7,540 | ___do___ | 134 | 2.53 | 200 | 9 |
| 108a | 76 | 10,300 | ___do___ | 134 | 3.46 | 200 | 9 |
| 109a | 77 | 12,130 | ___do___ | 134 | 4.07 | 200 | 9 |
| 110a | 78 | 5,575 | ___do___ | 134 | 1.87 | 200 | 9 |
| 111a | 78 | 5,575 | Dodecenyl succinic | 266 | 0.94 | 200 | 9 |
| 112a | 78 | 5,575 | Dimeric fatty acid | 600 | 0.42 | 200 | 9 |
| 113a | 79 | 13,850 | Diglycolic | 134 | 4.65 | 200 | 9 |
| 114a | 80 | 4,050 | ___do___ | 134 | 1.36 | 200 | 9 |
| 115a | 81 | 6,880 | ___do___ | 134 | 2.31 | 200 | 9 |
| 116a | 82 | 8,470 | ___do___ | 134 | 2.84 | 200 | 9 |
| 117a | 83 | 9,770 | ___do___ | 134 | 3.28 | 200 | 9 |
| 118a | 83 | 9,770 | Maleic | 98 | 4.48 | 200 | 9 |
| 119a | 83 | 9,770 | Azelaic | 188 | 2.34 | 200 | 9 |
| 120a | 84 | 11,190 | Diglycolic | 134 | 3.76 | 200 | 9 |
| 121a | 85 | 12,870 | ___do___ | 134 | 4.32 | 200 | 9 |
| 122a | 86 | 7,930 | ___do___ | 134 | 2.66 | 200 | 9 |
| 123a | 87 | 7,680 | ___do___ | 134 | 2.58 | 200 | 9 |
| 124a | 88 | 8,370 | ___do___ | 134 | 2.81 | 200 | 9 |
| 125a | 88 | 8,370 | Hexahydrophthalic | 154 | 2.35 | 200 | 9 |
| 126a | 88 | 8,370 | Tetracarboxybutane | 234 | 1.61 | 200 | 9 |
| 127a | 89 | 8,100 | Diglycolic | 134 | 2.72 | 200 | 9 |
| 128a | 90 | 9,620 | ___do___ | 134 | 3.23 | 200 | 9 |
| 129a | 91 | 8,880 | ___do___ | 134 | 2.98 | 200 | 9 |
| 130a | 92 | 10,510 | ___do___ | 134 | 3.53 | 200 | 9 |
| 131a | 93 | 10,870 | ___do___ | 134 | 3.65 | 200 | 9 |
| 132a | 93 | 10,870 | Trilinoleic | 835 | 0.59 | 200 | 9 |
| 133a | 93 | 10,870 | Aconitic | 174 | 2.81 | 200 | 9 |
| 134a | 94 | 10,890 | Diglycolic | 134 | 3.65 | 200 | 9 |
| 135a | 95 | 11,470 | ___do___ | 134 | 3.85 | 200 | 9 |
| 136a | 96 | 10,360 | ___do___ | 134 | 3.35 | 300 | 13 |
| 137a | 97 | 11,730 | ___do___ | 134 | 3.80 | 300 | 13 |
| 138a | 98 | 13,330 | ___do___ | 134 | 4.31 | 300 | 13 |
| 139a | 99 | 13,930 | ___do___ | 134 | 4.51 | 300 | 13 |
| 140a | 99 | 13,930 | Maleic | 98 | 6.17 | 300 | 13 |
| 141a | 100 | 14,610 | Diglycolic | 134 | 4.72 | 300 | 13 |
| 142a | 101 | 15,330 | ___do___ | 134 | 4.96 | 300 | 13 |
| 143a | 102 | 16,010 | ___do___ | 134 | 5.38 | 300 | 13.5 |
| 144a | 103 | 17,620 | ___do___ | 134 | 5.92 | 300 | 13.5 |
| 145a | 103 | 17,620 | Phthalic | 148 | 5.36 | 300 | 13.5 |
| 146a | 109 | 5,980 | Diglycolic | 134 | 2.23 | 200 | 10 |
| 147a | 110 | 6,290 | Dimeric fatty acid | 600 | 0.52 | 200 | 10 |
| 148a | 110 | 6,290 | Dodecenyl succinic | 266 | 1.18 | 200 | 10 |
| 149a | 110 | 6,290 | Diglycolic | 134 | 2.35 | 200 | 10 |
| 150a | 111 | 6,830 | ___do___ | 134 | 2.55 | 200 | 10 |
| 151a | 113 | 7,330 | ___do___ | 134 | 2.73 | 200 | 10 |
| 152a | 114 | 7,480 | ___do___ | 134 | 2.79 | 200 | 10 |
| 153a | 115 | 9,000 | ___do___ | 134 | 3.36 | 200 | 10 |
| 154a | 116 | 9,720 | Phthalic | 148 | 3.28 | 200 | 10 |
| 155a | 116 | 9,720 | Tetracarboxybutane | 234 | 2.07 | 200 | 10 |

TABLE XIII—Continued

| Ex. No. of ester | Ex. No. of glycol | Mol. weight of glycol | Acid or anhydride used | Mol. weight of acid | Molal ratio, acid to glycol | Glycol used, gms. | Polycarboxy reactant, gms. |
|---|---|---|---|---|---|---|---|
| 156a | 116 | 9,720 | Diglycolic | 134 | 3.62 | 200 | 10 |
| 157a | 117 | 10,480 | ----do---- | 134 | 3.91 | 200 | 10 |
| 158a | 118 | 11,230 | ----do---- | 134 | 4.19 | 200 | 10 |
| 159a | 119 | 11,980 | ----do---- | 134 | 4.47 | 200 | 10 |
| 160a | 120 | 13,470 | ----do---- | 134 | 5.02 | 200 | 10 |
| 161a | 121 | 14,970 | Maleic | 98 | 7.64 | 200 | 10 |
| 162a | 121 | 14,970 | Dimeric fatty acid | 600 | 1.25 | 200 | 10 |
| 163a | 121 | 14,970 | Diglycolic | 134 | 5.58 | 200 | 10 |
| 164a | 122 | 15,710 | ----do---- | 134 | 5.86 | 200 | 10 |
| 165a | 123 | 16,450 | ----do---- | 134 | 6.14 | 200 | 10 |
| 166a | 124 | 17,950 | ----do---- | 134 | 6.70 | 200 | 10 |
| 167a | 125 | 19,570 | ----do---- | 134 | 7.30 | 200 | 10 |
| 168a | 127 | 21,250 | Azelaic | 188 | 5.65 | 200 | 10 |
| 169a | 127 | 21,250 | Tricarballylic | 176 | 6.04 | 200 | 10 |
| 170a | 127 | 21,250 | Diglycolic | 134 | 7.93 | 200 | 10 |
| 171a | 128 | 22,100 | ----do---- | 134 | 8.25 | 200 | 10 |
| 172a | 129 | 22,880 | ----do---- | 134 | 8.53 | 200 | 10 |
| 173a | AA-34 | 3,200 | ----do---- | 134 | 1.06 | 100 | 4.5 |
| 174a | AA-35 | 3,780 | ----do---- | 134 | 1.26 | 100 | 4.5 |
| 175a | AA-36 | 4,650 | ----do---- | 134 | 1.54 | 100 | 4.5 |
| 176a | AA-37 | 3,025 | ----do---- | 134 | 1.01 | 100 | 4.5 |
| 177a | AA-38 | 3,605 | ----do---- | 134 | 1.19 | 100 | 4.5 |
| 178a | AA-39 | 4,765 | Maleic | 98 | 1.98 | 100 | 4.5 |
| 179a | AA-40 | 8,514 | ----do---- | 98 | 2.85 | 100 | 4.5 |
| 180a | AA-41 | 8,804 | ----do---- | 98 | 4.39 | 100 | 4.5 |
| 181a | AA-42 | 9,964 | Phthalic | 148 | 3.04 | 100 | 4.5 |
| 182a | AA-43 | 11,124 | ----do---- | 148 | 3.39 | 100 | 4.5 |
| 183a | AA-44 | 3,103 | Diglycolic | 134 | 1.03 | 100 | 4.5 |
| 184a | AA-45 | 1,310 | ----do---- | 134 | .43 | 100 | 4.5 |
| 185a | AA-46 | 2,108 | ----do---- | 134 | .70 | 100 | 4.5 |
| 186a | AA-47 | 1,304 | ----do---- | 134 | .43 | 100 | 4.5 |
| 187a | AA-48 | 1,664 | ----do---- | 134 | .55 | 100 | 4.5 |
| 188a | 1aa | 1,238 | ----do---- | 134 | .41 | 100 | 4.5 |
| 189a | 1aaaa | 1,748 | Maleic | 98 | .79 | 100 | 4.5 |
| 190a | 1aaaaa | 1,968 | Phthalic | 148 | .60 | 100 | 4.5 |
| 191a | 3aa | 1,990 | Diglycolic | 134 | .66 | 100 | 4.5 |
| 192a | 3aaaa | 2,500 | Maleic | 98 | 1.24 | 100 | 4.5 |
| 193a | 3aaaaa | 2,720 | Phthalic | 148 | .83 | 100 | 4.5 |

TABLE XIV

| Ex. No. of ester | Solvent used | Amount solvent, grams | Max. esterification temp., °C. | Time of esterification, hrs. | Water out. C.C. | Percent solvent in final product |
|---|---|---|---|---|---|---|
| 4a | Mixed aromatic | 100 | 204 | 8 | 0.5 | 32.4 |
| 5a | ----do---- | 100 | 200 | 7.5 | 1.5 | 32.4 |
| 6a | ----do---- | 100 | 203 | 7.5 | 0.8 | 32.4 |
| 7a | ----do---- | 100 | 176 | 7.5 | 1.4 | 32.4 |
| 8a | ----do---- | 100 | 202 | 10 | 1.4 | 32.0 |
| 9a | ----do---- | 100 | 198 | 10 | 0 | 32.0 |
| 10a | ----do---- | 100 | 199 | 10 | 1.4 | 32.0 |
| 11a | ----do---- | 100 | 188 | 10 | 0.5 | 32.0 |
| 12a | ----do---- | 100 | 196 | 10 | 0.3 | 32.0 |
| 13a | ----do---- | 100 | 187 | 10 | 2.0 | 32.0 |
| 14a | Xylene | 100 | 196 | 7.75 | 2.6 | 32.0 |
| 15a | ----do---- | 100 | 217 | 7.75 | 0.7 | 32.0 |
| 16a | ----do---- | 100 | 209 | 7.75 | 0 | 32.0 |
| 17a | ----do---- | 100 | 211 | 7.75 | 1.0 | 32.0 |
| 18a | ----do---- | 106 | 210 | 7.75 | 0.9 | 29.4 |
| 19a | ----do---- | 117 | 244 | 7.75 | 1.1 | 41.7 |
| 20a | ----do---- | 101 | 230 | 7.75 | 1.55 | 38.3 |
| 21a | ----do---- | 105 | 300 | 7.75 | 0 | 39.3 |
| 22a | ----do---- | 108.5 | 225 | 7.5 | 2.3 | 40.3 |
| 23a | ----do---- | 105 | 230 | 7.5 | 0 | 40.1 |
| 24a | ----do---- | 105 | 210 | 7.5 | 0 | 39.8 |
| 25a | ----do---- | 105 | 204 | 7.5 | 1.45 | 39.6 |
| 26a | ----do---- | 101 | 201 | 7.5 | 1.0 | 38.6 |
| 27a | ----do---- | 97.5 | 227 | 7.5 | 0.9 | 37.8 |
| 28a | ----do---- | 99 | 225 | 7.5 | 1.2 | 38.1 |
| 29a | ----do---- | 112 | 203 | 7.5 | 1.1 | 41.0 |
| 30a | ----do---- | 110 | 200 | 7.5 | 0 | 40.8 |
| 31a | ----do---- | 110 | 204 | 7.5 | 1.4 | 41.1 |
| 32a | ----do---- | 93 | 206 | 95 | 2.2 | 36.8 |
| 33a | ----do---- | 74 | 192 | 6.25 | 1.3 | 28.4 |
| 34a | ----do---- | 74 | 197 | 6.25 | 0.6 | 28.2 |
| 35a | ----do---- | 72 | 185 | 6.25 | 1.15 | 27.6 |
| 36a | ----do---- | 67 | 188 | 6.25 | 1.75 | 26.3 |
| 37a | ----do---- | 70 | 191 | 6.25 | 0 | 27.0 |
| 38a | ----do---- | 70 | 196 | 6.25 | 0 | 27.2 |
| 39a | ----do---- | 71 | 197 | 6.25 | 1.1 | 27.5 |
| 40a | ----do---- | 69 | 195 | 6.25 | 0.1 | 27.0 |
| 41a | ----do---- | 71 | 188 | 6 | 1.5 | 27.6 |
| 42a | ----do---- | 69 | 195 | 6 | 0 | 26.9 |
| 43a | ----do---- | 66 | 195 | 6 | 0.55 | 26.2 |
| 44a | ----do---- | 66 | 195 | 6 | 1.2 | 26.1 |
| 45a | ----do---- | 66 | 195 | 6 | 0.5 | 26.0 |
| 46a | ----do---- | 66 | 195 | 6 | 0.9 | 26.1 |
| 47a | ----do---- | 58 | 195 | 6 | 1.4 | 26.3 |
| 48a | ----do---- | 62 | 196 | 6 | 1.1 | 26 |
| 49a | ----do---- | 100 | 205 | 6.5 | 1.2 | 27.4 |
| 50a | ----do---- | 100 | 199 | 6.5 | 1.1 | 27.6 |
| 51a | ----do---- | 100 | 198 | 6.5 | 0 | 27.6 |
| 52a | ----do---- | 100 | 196 | 6.5 | 0 | 27.4 |
| 53a | ----do---- | 100 | 194 | 6.5 | 0.3 | 27.4 |
| 54a | ----do---- | 100 | 202 | 6.5 | 1.05 | 27.4 |
| 55a | ----do---- | 100 | 176 | 7 | 2.1 | 27.4 |
| 56a | ----do---- | 100 | 184 | 7 | 0.5 | 27.4 |
| 57a | Xylene | 100 | 211 | 7 | 2.3 | 27.4 |
| 58a | ----do---- | 100 | 206 | 7 | 2.1 | 27.4 |
| 59a | ----do---- | 100 | 210 | 7 | 2.4 | 27.4 |
| 60a | ----do---- | 100 | 204 | 7 | 0.7 | 27.4 |
| 61a | ----do---- | 100 | 204 | 7 | 0.3 | 27.4 |
| 62a | ----do---- | 75 | 212 | 7 | 1.9 | 31.8 |
| 63a | ----do---- | 75 | 183 | 6 | 1.1 | 31.8 |
| 64a | ----do---- | 75 | 190 | 6 | 0.6 | 31.8 |
| 65a | ----do---- | 75 | 190 | 6 | 1.8 | 31.8 |
| 66a | ----do---- | 75 | 191 | 6 | 0.6 | 31.8 |
| 67a | ----do---- | 75 | 192 | 6 | 0.5 | 31.8 |
| 68a | ----do---- | 100 | 199 | 6 | 1.9 | 27.4 |
| 69a | ----do---- | 75 | 192 | 6 | 1.2 | 31.8 |
| 70a | ----do---- | 75 | 196 | 6 | 0.3 | 31.8 |
| 71a | ----do---- | 75 | 189 | 6 | 2.1 | 31.8 |
| 72a | ----do---- | 75 | 190 | 6 | 2.0 | 31.8 |
| 73a | ----do---- | 75 | 189 | 6 | 0 | 31.8 |
| 74a | ----do---- | 75 | 189 | 6 | 0.85 | 31.8 |
| 75a | ----do---- | 100 | 199 | 6 | 0.5 | 27.4 |
| 76a | ----do---- | 75 | 196 | 6 | 0.3 | 31.8 |
| 77a | ----do---- | 75 | 199 | 6 | 0.6 | 31.8 |
| 78a | ----do---- | 75 | 192 | 6 | 2.2 | 31.8 |
| 79a | ----do---- | 75 | 196 | 6 | 2.1 | 31.8 |
| 80a | ----do---- | 75 | 192 | 6 | 0.8 | 31.8 |
| 81a | ----do---- | 75 | 197 | 6.75 | 0.5 | 31.8 |
| 82a | ----do---- | 100 | 196 | 6.75 | 1.1 | 27.4 |
| 83a | ----do---- | 75 | 197 | 6.75 | 0.4 | 31.8 |
| 84a | ----do---- | 75 | 195 | 6.75 | 0.3 | 31.8 |
| 85a | ----do---- | 75 | 196 | 6.75 | 2.5 | 31.8 |
| 86a | ----do---- | 75 | 195 | 6.75 | 2.4 | 31.8 |
| 87a | ----do---- | 75 | 196 | 6.75 | 0 | 31.8 |
| 88a | ----do---- | 75 | 196 | 6.75 | 1.4 | 31.8 |
| 89a | ----do---- | 100 | 175 | 7 | 1.4 | 27.4 |
| 90a | ----do---- | 75 | 189 | 7 | 1.6 | 31.8 |
| 91a | ----do---- | 75 | 185 | 7 | 0.5 | 31.8 |
| 92a | ----do---- | 75 | 190 | 7 | 1.1 | 31.8 |
| 93a | ----do---- | 75 | 199 | 7 | 0 | 31.8 |
| 94a | ----do---- | 75 | 200 | 7 | 0 | 31.8 |
| 95a | ----do---- | 75 | 250 | 7 | 0.2 | 31.8 |
| 96a | ----do---- | 75 | 195 | 7 | 2.05 | 31.8 |
| 97a | None | | 190 | 6 | 2.0 | |
| 98a | ----do---- | | 190 | 6 | 0 | |
| 99a | ----do---- | | 190 | 8 | 0 | |
| 100a | ----do---- | | 190 | 8 | 3.0 | |
| 101a | ----do---- | | 190 | 8 | 0 | |
| 102a | ----do---- | | 190 | 8 | 0 | |
| 103a | ----do---- | | 190 | 6 | 2.7 | |
| 104a | ----do---- | | 190 | 7 | 0 | |
| 105a | ----do---- | | 190 | 6 | 0 | |
| 106a | Mixed aromatic | 97.8 | 190 | 6 | 2.0 | 20.8 |
| 107a | ----do---- | 102 | 190 | 6 | 1.0 | 21.8 |
| 108a | ----do---- | 106 | 190 | 6 | 1.0 | 22.4 |
| 109a | ----do---- | 102 | 190 | 6 | 1.0 | 22.9 |

TABLE XIV—Continued

| Ex. No. of ester | Solvent used | Amount solvent, grams | Max. esterification temp., °C | Time of esterification, hrs. | Water out. C.C. | Percent solvent in final product |
|---|---|---|---|---|---|---|
| 110a | Mixed aromatic | 110 | 190 | 5 | 1.0 | 23.5 |
| 111a | do | 110 | 190 | 6 | 0 | 24.2 |
| 112a | do | 110 | 190 | 6 | 1.0 | 25.3 |
| 113a | do | 110 | 190 | 6 | 3.2 | 26.6 |
| 114a | do | 110 | 190 | 6 | 3.1 | 28.0 |
| 115a | do | 110 | 190 | 6 | 2.0 | 26.4 |
| 116a | do | 110 | 190 | 6 | 2.2 | 25.9 |
| 117a | do | 110 | 190 | 6 | 3.4 | 25.7 |
| 118a | do | 110 | 190 | 6 | 0 | 25.7 |
| 119a | do | 110 | 190 | 6 | 2.0 | 25.9 |
| 120a | do | 110 | 190 | 6 | 2.0 | 25.8 |
| 121a | do | 110 | 190 | 6 | 2.0 | 27.6 |
| 122a | do | 110 | 190 | 6 | 2.0 | 26.0 |
| 123a | do | 110 | 190 | 6 | 2.0 | 27.0 |
| 124a | do | 110 | 190 | 6 | 1.0 | 28.0 |
| 125a | do | 110 | 190 | 6 | 0 | 28.2 |
| 126a | do | 110 | 190 | 6 | 2.0 | 28.0 |
| 127a | do | 110 | 190 | 6 | 2.0 | 28.6 |
| 128a | do | 110 | 190 | 6 | 2.5 | 25.3 |
| 129a | do | 110 | 190 | 6 | 3.0 | 25.6 |
| 130a | do | 110 | 190 | 6 | 2.0 | 24.4 |
| 131a | do | 110 | 190 | 6 | 2.0 | 25.75 |
| 132a | do | 110 | 190 | 6 | 2.0 | 25.3 |
| 133a | do | 110 | 190 | 6 | 2.0 | 25.1 |
| 134a | do | 110 | 190 | 6 | 2.5 | 24.3 |
| 135a | do | 110 | 190 | 6 | 2.0 | 21.5 |
| 136a | None | | 190 | 6 | 12.5 dist. | −25″ vac. |
| 137a | do | | 190 | 6 | 9.5 | |
| 138a | do | | 190 | 6 | 8.0 | |
| 139a | do | | 190 | 6 | 7.0 | |
| 140a | do | | 190 | 6 | 0 | |
| 141a | do | | 190 | 6 | 12.0 | |
| 142a | do | | 190 | 6 | 5.6 | |
| 143a | do | | 190 | 6 | 4.0 | |
| 144a | do | | 190 | 6 | 5.5 | |
| 145a | do | | 190 | 6 | 0 | |
| 146a | Mixed aromatic | 110 | 190 | 6 | 2.0 | 21.8 |
| 147a | do | 110 | 190 | 6 | 2.0 | 23.8 |
| 148a | do | 110 | 190 | 6 | 0 | 24.6 |
| 149a | do | 110 | 190 | 6 | 2.0 | 23.4 |
| 150a | do | 110 | 190 | 6 | 2.5 | 26.0 |
| 151a | do | 110 | 190 | 6 | 3.0 | 25.4 |
| 152a | do | 110 | 190 | 6 | 3.0 | 24.6 |
| 153a | do | 110 | 190 | 6 | 3.0 | 20.9 |
| 154a | do | 110 | 190 | 6 | 0 | 23.6 |
| 155a | do | 110 | 190 | 6 | 3.0 | 24.0 |
| 156a | do | 110 | 190 | 6 | 3.0 | 23.5 |
| 157a | do | 110 | 190 | 6 | 3.5 | 24.1 |
| 158a | do | 110 | 190 | 6 | 2.5 | 24.3 |
| 159a | do | 158 | 190 | 6 | 3.5 | 26.1 |
| 160a | do | 175.8 | 190 | 6 | 3.0 | 37.7 |
| 161a | do | 110 | 190 | 6 | 3.0 | 24.7 |
| 162a | do | 110 | 190 | 6 | 3.0 | 25.1 |
| 163a | do | 110 | 190 | 6 | 3.0 | 24.7 |
| 164a | do | 110 | 190 | 6 | 3.0 | 26.1 |
| 165a | do | 110 | 190 | 6 | 2.0 | 22.9 |
| 166a | do | 110 | 190 | 6 | 3.0 | 25.7 |
| 167a | do | 110 | 190 | 6 | 3.0 | 26.1 |
| 168a | do | 110 | 190 | 6 | 2.0 | 25.2 |
| 169a | do | 110 | 190 | 6 | 2.0 | 24.2 |
| 170a | do | 110 | 190 | 6 | 2.5 | 23.5 |
| 171a | do | 110 | 190 | 6 | 3.0 | 22.5 |
| 172a | do | 110 | 190 | 6 | 3.0 | 26.2 |

PART 5

For the purpose of resolving petroleum emulsions of the water-in-oil type, I prefer to employ products having sufficient hydrophile character to meet at least the test set forth in U.S. Patent 2,499,368, dated March 7, 1950, to De Groote and Keiser. In said patent such test for emulsification using a water insoluble solvent, generally xylene, is described as an index of surface activity.

The above mentioned test, i.e., a conventional emulsification test, simply means that the preferred product for demulsification is soluble in a solvent having hydrophobe properties or in an oxygenated water-insoluble solvent, or a mixture containing a fraction of such solvent with the proviso that when such solution in a hydrocarbon solvent is shaken with water the product may remain in the nonaqueous solvent or, for that matter, it may pass into the aqueous solvent. In other words, although it is xylene soluble, for example, it may also be water soluble to an equal or greater degree. This test is performed with distilled water at ordinary room temperature, for instance, 22.5° C. or thereabouts.

As to the use of conventional demulsifying agents, reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, the products of the present invention are employed instead.

In general, the products of this invention which have been found most effective in the resolution of petroleum emulsions of the water-in-oil type are those having a molecular weight greater than about 2,000 although some of the products having a molecular weight as low as 1,500 have been found to be effective.

The following examples of Table XV show results obtained in the resolution of crude petroleum emulsions obtained from various sources. These crude petroleum emulsions are described as Emulsified Oils A through R and their source and water content are set forth below. For Emulsified Oils A through O, the pipeline oil requirement was ½ of 1% basic sediment and water content (B.S. & S.) or less and for Emulsified Oils P, Q and R, the pipeline oil requirement was 3% B.S. & W. or less. In the examples, the crude oils in all instances, after demulsification, met these standards and in many instances the amount of foreign material remaining (B.S. & W.) was considerably less than pipeline requirements. In some instances the ratios reported are comparatively low but the reason is that the oil treated was either a more difficult oil or that tests were run against standards in a comparatively short period of time, for instance two hours or maybe two hours cold, whereas actually, in the plant where commercial demulsification occurs, the oils take a matter of six or eight hours and the temperature instead of being cold may have been 120 or 130° F.

The emulsified oils employed in the examples were as follows:

*Emulsified Oil A*

This was obtained from Duval 49 Lease, Well No. 3, of Magnolia Petroleum Company, Freer, Texas. The amount of emulsified water was about 45%.

*Emulsified Oil B*

This was obtained from Cockrum Lease, Well No. 2, of Magnolia Petroleum Company, Bolton, Mississippi, and the amount of emulsified water was 20%.

*Emulsified Oil C*

This oil was from Shyrock Lease, Well No. 3, Stanolind Oil and Gas Company, Hastings, Texas. The amount of water was equivalent to 35%.

*Emulsified Oil D*

This was a sample from Taylor Lease, Well No. 7, of Gulf Coast Leaseholders Oil Company, Bolling, Texas. The amount of water was 35%.

*Emulsified Oil E*

Oil was obtained from Well No. D-3, O'Brien Lease, Blanco Oil Company, Greta, Texas, and amount of emulsified water was 60%.

*Emulsified Oil F*

This was from Chubbee Lease, Well No. 7, Texas Company, Lone Grove, Oklahoma. Amount of emulsified water was 50%.

*Emulsified Oil G*

This was obtained from Dowlen Lease, Well No. 12, of Stanolind Oil and Gas Company, West Beaumont, Texas, and the amount of emulsified water was 40%.

*Emulsified Oil H*

This oil was from Well No. 1, Pennock Lease, Stanolind Oil and Gas Company, Hastings, Texas. Amount of emulsified water was 40%.

Emulsified Oil I

Oil obtained from Well No. 12, O'Brien Lease, Sunray Oil Company, Refugio, Texas. The emulsified oil was in the amount of 40%.

Emulsified Oil J

This oil was from the Alexander Lease, Pan American Oil Company, Conroe, Texas, and was a composite, containing 35% emulsified water.

Emulsified Oil K

This oil was from the Trosclair Lease, Well No. B-1, of Austral Exploration Company, Anse La Butte, Louisiana, and emulsified water was equivalent to 20%.

Emulsified Oil L

Oil from Well No. 1, D. Case Lease, California Oil Company, Brookhaven, Mississippi, containing about 15% emulsified water.

Emulsified Oil M

This was from Fuller Lease Well No. 1, J. G. Beard Oil Company, Seven Pines, Texas. It contained about 35% water, emulsified.

Emulsified Oil N

This oil was from Well No. 1, Cathey Lease, Frankfort Oil Company, Ringling, Oklahoma, containing 45% emulsified water.

Emulsified Oil O

This oil was from Well No. 7, Mann Lease, A. J. Atkinson Company, Comanche, Oklahoma, containing 12% water in emulsified form.

Emulsified Oil P

This oil was obtained from Ten A, 1st low trap, North Coles Levee, Richfield Oil Company, Los Angles, California, and contained 8.5% water, emulsified.

Emulsified Oil Q

Oil from Tank Farm 1, Wash Tank 5 and 3, Southwest Exploration Co., Huntington Beach, California, and contained about 16% emulsified water.

Emulsified Oil R

This was from Taylor Lease, composite, Shell Oil Company, Ventura, California, and contained 6% emulsified water.

The compounds of this invention employed as demulsifier in the examples were as follows:

Demulsifier No. 1

This demulsifier was prepared by reacting one pound of dipropyleneglycol with 2 pounds of ethylene oxide, then with 30.5 pounds of propylene oxide, and then with 3.7 pounds of ethylene oxide.

The diol thus obtained, using an alkaline catalyst and an oxyalkylating temperature of not over 125° C., was neutralized with acetic acid.

10 pounds of the diol were reacted with 0.45 pound of diglycolic acid.

The reaction took place in the presence of an equal volume of xylene and a phase separating trap was employed. The reaction was continued until there was no further evolution of water.

The same procedure in regard to oxyalkylation, i.e., use of an alkaline catalyst at a temperature of not over 125° C., was employed in all subsequent examples. The method of esterification, which is conventional, was employed in all subsequent examples.

Demulsifier No. 2

One pound of dipropyleneglycol was reacted with 2 pounds of ethylene oxide, then with 39.3 pounds of propylene oxide, and then in the final stage with 4.7 pounds of ethylene oxide.

10 pounds of the diol were reacted with 0.45 pound of diglycolic acid.

Demulsifier No. 3

One pound of dipropyleneglycol was reacted with 2 pounds of ethylene oxide, then with 39.3 pounds of propylene oxide, and then with 18.3 pounds of ethylene oxide.

10 pounds of the diol were reacted with 0.45 pound of diglycolic acid.

Demulsifier No. 4

One pound of dipropyleneglycol was reacted with 4 pounds of propylene oxide, then with four pounds of ethylene oxide, and in the final step with 30.7 pounds of propylene oxide.

10 pounds of the diol were reacted with 0.45 pound of diglycolic acid.

Demulsifier No. 5

One pound of dipropyleneglycol was reacted with 4 pounds of propylene oxide, then with 4 pounds of ethylene oxide, followed by 31.5 pounds of propylene oxide, and then with 4.4 pounds of ethylene oxide.

10 pounds of the diol were reacted with 0.45 pound of diglycolic acid.

Demulsifier No. 6

One pound of dipropyleneglycol was reacted with 4 pounds of propylene oxide, followed by 4 pounds of ethylene oxide, followed by 30.7 pounds of propylene oxide, followed by 45.7 pounds of ethylene oxide.

10 pounds of the diol were reacted with 0.45 pound of diglycolic acid.

Demulsifier No. 7

One pound of dipropyleneglycol was reacted with 4 pounds of propylene oxide, followed by 4 pounds of ethylene oxide, and then with 59 pounds of propylene oxide, and then in the final stage with 7.7 pounds of ethylene oxide.

10 pounds of the diol were reacted with 0.45 pound of diglycolic acid.

Demulsifier No. 8

One pound of dipropyleneglycol was reacted with 5 pounds of propylene oxide, followed by 10 pounds of ethylene oxide, followed by 9.9 pounds of propylene oxide, followed by 2 pounds of ethylene oxide, and in the final stage with 4.2 pounds of propylene oxide.

10 pounds of the diol were reacted with 0.45 pound of diglycolic acid.

Demulsifier No. 9

This demulsifier was prepared in the same way as Demulsifier No. 8, preceding, except that in the final oxypropylation stage, instead of using 4.2 pounds of propylene oxide, 6.7 pounds of propylene oxide were employed.

10 pounds of the diol were reacted with 0.45 pound of diglycolic acid.

Demulsifier No. 10

One pound of dipropyleneglycol was reacted with 15 pounds of propylene oxide followed by reaction with 9 pounds of ethylene oxide, followed by reaction with 9.9 pounds of propylene oxide, followed by reaction with 11.7 pounds of ethylene oxide, followed by reaction with 51.5 pounds of propylene oxide, and in the final stage with 4.87 pounds of ethylene oxide.

10 pounds of the diol were reacted with 0.455 pound of diglycolic acid.

Demulsifier No. 11

The demulsifier was prepared exactly in the same way as in the case of Demulsifier No. 9, above except that in the final stage instead of reacting with 4.87 pounds of ethylene oxide, there was used 25.1 pounds of ethylene oxide.

10 pounds of the diol were reacted with .45 pound of diglycolic acid.

*Demulsifier No. 12*

One pound of dipropylene glycol was reacted with 15 pounds of propylene oxide followed by reaction with 10 pounds of ethylene oxide, followed by reaction with 9.9 pounds of propylene oxide and in the final stage by 7.0 pounds of ethylene oxide.

10 pounds of the diol were reacted with 0.45 pound of diglycolic acid.

*Demulsifier No. 13*

The diol employed was the same as the diol described in the preceding demulsifier through the second oxypropylation stage, i.e., where 9.9 pounds of propylene oxide were added. In the next stage, instead of adding 7 pounds, 11.7 pounds of ethylene oxide were added, and then there was added in the final stage 20.4 pounds of propylene oxide.

10 pounds of the diol were reacted with 0.45 pound of diglycolic acid.

*Demulsifier No. 14*

The same procedure was followed as in the preparation of the diol as in Demulsifier No. 12, preceding, except that after the final oxyethylation stage in which 7.0 pounds of ethylene oxide were added, there was added instead 4.7 pounds of propylene oxide.

10 pounds of the product were reacted with 0.45 pound of diglycolic acid.

TABLE XV

| Test No. | Emulsified oil No. | Demulsifier No. | Ratio | ° F. temp. | Hours time | Percent water separated |
|---|---|---|---|---|---|---|
| 1 (A5) | A | 5 | 1:6,250 | Cold | 2 | 45 |
| 2 (A4) | A | 4 | 1:6,250 | Cold | 2 | 45 |
| 3 (B7) | B | 7 | 1:6,250 | 160 | 3 | 20 |
| 4 (C4) | C | 4 | 1:12,500 | Cold | 1 | 35 |
| 5 (C5) | C | 5 | 1:12,500 | Cold | 1½ | 35 |
| 6 (D5) | D | 5 | 1:8,333 | Cold | 1½ | 35 |
| 7 (E6) | E | 6 | 1:12,500 | Cold | 2 | 60 |
| 8 (F7) | F | 7 | 1:7,143 | Cold | 2 | 50 |
| 9 (G8) | G | 8 | 1:10,000 | Cold | 1 | 40 |
| 10 (H9) | H | 9 | 1:12,500 | Cold | 1 | 40 |
| 11 (I8) | I | 8 | 1:12,500 | Cold | 3 | 40 |
| 12 (I9) | I | 9 | 1:12,500 | Cold | 2 | 40 |
| 13 (J4) | J | 4 | 1:8,333 | 140 | 2 | 35 |
| 14 J9 | J | 9 | 1:8,333 | 140 | 3 | 35 |
| 15 (K8) | K | 8 | 1:6,250 | 140 | 1 | 20 |
| 16 (L8) | L | 8 | 1:4,167 | 170 | 1½ | 15 |
| 17 (M9) | M | 9 | 1:10,000 | 130 | 2½ | 35 |
| 18 (N8) | N | 8 | 1:8,333 | Cold | 1½ | 45 |
| 19 (O9) | O | 9 | 1:6,250 | Cold | 3 | 12 |
| 20 (R19) | R | 10 | 1:20,000 | 140 | 11 | 14 |
| 21 (R20) | R | 11 | 1:20,000 | 140 | 11 | 14 |
| 22 (Q21) | Q | 12 | 1:16,000 | 140 | 24 | 26 |
| 23 (Q22) | Q | 13 | 1:16,000 | 140 | 24 | 26 |
| 24 (Q24) | Q | 14 | 1:16,000 | 140 | 24 | 26 |

PART 6

The esters herein described, whether monomeric or polymeric and whether having a free hydroxyl group or free carboxyl group or both, may be used for a variety of purposes. However, we have found it particularly desirable for many applications to obtain an acidic ester, whether monomeric or polymeric and neutralize with caustic soda, caustic potash, or ammonia. Likewise, we can neutralize with a water-soluble amine, such as methylamine, diethylamine, or trimethylamine or the comparable ethyl or propyl derivatives. We can also neutralize with derivatives such as hydroxylated amines including ethanolamine, diethanolamine and triethanolamine. We can also neutralize with high molal amines as, for example, amines obtained from higher fatty acids having 8 to 18 carbon atoms. We can also neutralize with polyamines such as ethylene diamine, diethylene triamine, etc. Thus, we have been able to obtain a variety of products in which we can shift the hydrophobe-hydrophile balance to some degree, either in the hydrophobe direction or hydrophile direction. In some instances the hydrophobe-hydrophile balance may be changed comparatively little or not at all. Such derivatives obtained in the manner described may be used for breaking petroleum emulsions of the water-in-oil type. They also can be converted into derivatives of the kind subsequently described which also may be used for this same purpose. Such derivatives are useful for other purposes including the same purpose for which the herein described products are effective. The herein described products may be used for various purposes where detergents, common solvents, emulsifiers, and the like are used. They may be used as lubricants and as additives to fluids used in hydraulic brake systems; they may be used as emulsifying agents to emulsify or remove greases or dirt; they may be used in the manufacture of a variety of other materials such as soluble oils, insecticide sprays, etc.

One may use a salt of the kind described as a fuel oil additive in the manner described in U.S. Patent No. 2,553,183, dated May 15, 1951, to Caron et al. It can be used in substantially the same proportions or lower proportions and this is particularly true when used in conjunction with a glyoxalidine, or amido glyoxaladine.

An analogous use in which these products are equally satisfactory is that described in U.S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U.S. Patents Nos. 2,550,981 and 2,550,982, both dated May 1, 1951, and both to Eberz. Here, again, it can be used in the same proportions as herein indicated or even small proportions.

A third use is to replace oil soluble petroleum sulfonates, so-called mahogany soaps, in the preparation of certain emulsions or soluble oils or emulsifiable lubricants where such mahogany soaps are employed. The co-generic mixtures having this peculiar property serve to replace all or a substantial part of the mahogany soap.

Another use is where the product does not serve as an emulsifying agent alone but serves as an adjunct.

Briefly stated, the fourth use is concerned with use as a coupling agent to be employed with an emulsifying agent. See "The Compositions and Structure of Technical Emulsions," J. H. Goodey, Roy. Australian Chem. Inst. J. and Proc., vol. 16, 1949, pp. 47–75. As stated, in the summary of this article, it states:

"The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving a hydrocarbon radical attached to an ionizable group."

Fifth, these materials have particular utility in increasing the yield of an oil well by various procedures which in essence involve the use of fracturing of the strata by means of liquid pressure. A mixture of these products with oil or oil in combination with a gel former alone, or a gel former and finely divided mineral particles, yields a product which, when it reaches crevices in the strata which are yielding water, forms a gelatinous mass of curdy precipitate or solid or semi-solid emulsion of a high viscosity. In any event it represents a rapid geling agent for the strata crevices and permits pressure to be applied to fracture the strata without loss of fluid through crevices, openings or the like.

The herein described products and the derivatives thereof are particularly valuable in flooding processes for recovery of oil from subterranean oil-bearing strata when employed in the manner described in U.S. Patent No.

2,233,381, dated February 25, 1941, to De Groote and Keiser.

I claim:

A member of the class consisting of monomeric and polymeric solvent soluble esters of polycarboxy acids having up to four carboxyl groups, having up to 50 carbon atoms, and in which the carboxy groups are the sole reactive groups with a polyoxyalkylene glycol mixture consisting of a product which statistically represented has a plurality of alternating hydrophobic and hydrophilic polyoxyalkylene chains the hydrophilic chains consisting of oxyethylene radicals linked one to the other and the hydrophobic chains consisting of radicals selected from the group consisting of oxypropylene and straight chain oxybutylene radicals linked one to the other, each such chain containing at least 2 and not more than 110 oxyalkylene radicals, said statistically represented product having an odd number of such chains linked together so that it consists of a series of alternating hydrophile and hydrophobe chains with the proviso that it contain a total of at least three hydrophobe chains and at least two hydrophile chains, with the further proviso that there be not more than fifteen such chains and with the final proviso that at least one internal hydrophile chain contain at least five oxyethylene radicals and that the molecular weight of the polyoxyalkylene glycol mixture be at least 1000.

References Cited in the file of this patent

UNITED STATES PATENTS

| | | |
|---|---|---|
| 2,295,165 | De Groote et al. | Sept. 8, 1942 |
| 2,562,878 | Blair | Aug. 7, 1951 |
| 2,695,914 | De Groote | Nov. 30, 1954 |
| 2,911,434 | Kocher | Nov. 3, 1959 |